(12) United States Patent
Still et al.

(10) Patent No.: US 9,091,545 B2
(45) Date of Patent: Jul. 28, 2015

(54) MOTION-RESOLVING HOVER DISPLAY

(75) Inventors: David L. Still, Pensacola, FL (US); Thomas C. Eskridge, Gulf Breeze, FL (US); Leonard A. Temme, Pensacola, FL (US)

(73) Assignee: Florida Institute for Human and Machine Cognition, Inc., Pensacola, FL (US)

( * ) Notice: Subject to any disclaimer, the term of this patent is extended or adjusted under 35 U.S.C. 154(b) by 1951 days.

(21) Appl. No.: 11/986,950

(22) Filed: Nov. 27, 2007

(65) Prior Publication Data

US 2009/0138142 A1 May 28, 2009

(51) Int. Cl.
*G01C 23/00* (2006.01)

(52) U.S. Cl.
CPC ..................... *G01C 23/00* (2013.01)

(58) Field of Classification Search
CPC ........ G01C 23/00; G01C 23/005; G05D 1/00; G05D 1/04–1/042; G05D 1/0669; G05D 1/08–1/0816; G05D 1/0858; G05D 1/10–1/102; G02B 27/01
USPC .............. 701/946, 3–9, 14–16; 340/946, 959, 340/963, 967, 969–971, 973–980
See application file for complete search history.

(56) References Cited

U.S. PATENT DOCUMENTS

| | | | | |
|---|---|---|---|---|
| 4,149,148 A * | 4/1979 | Miller et al. | ..................... | 345/27 |
| 4,247,843 A * | 1/1981 | Miller et al. | .................. | 340/973 |
| 4,825,194 A * | 4/1989 | Rasinski | ....................... | 340/975 |
| 5,150,117 A * | 9/1992 | Hamilton et al. | ............. | 340/973 |
| 5,248,968 A * | 9/1993 | Kelly et al. | .................... | 340/961 |
| 5,289,185 A * | 2/1994 | Ramier et al. | ................. | 340/971 |
| 5,797,562 A * | 8/1998 | Wyatt | ............................ | 244/1 R |
| 5,844,504 A * | 12/1998 | Etherington | .................. | 340/973 |
| 6,028,536 A * | 2/2000 | Voulgaris | ...................... | 340/975 |
| 6,111,525 A * | 8/2000 | Berlioz et al. | ................. | 340/971 |
| 6,255,965 B1 * | 7/2001 | D'Orso | ......................... | 340/946 |
| 6,262,674 B1 * | 7/2001 | Wyatt | ............................ | 340/975 |
| 6,285,926 B1 * | 9/2001 | Weiler et al. | ...................... | 701/4 |
| 6,469,640 B2 * | 10/2002 | Wyatt | ............................ | 340/975 |
| 6,702,229 B2 * | 3/2004 | Anderson et al. | .............. | 244/1 R |
| 6,867,711 B1 * | 3/2005 | Langner et al. | ................ | 340/979 |
| 6,879,886 B2 * | 4/2005 | Wilkins et al. | .................... | 701/3 |
| 6,885,313 B2 * | 4/2005 | Selk et al. | ...................... | 340/945 |
| 6,995,690 B1 * | 2/2006 | Chen et al. | ...................... | 340/974 |
| 7,010,398 B2 * | 3/2006 | Wilkins et al. | .................... | 701/3 |
| 7,091,881 B2 * | 8/2006 | Judge et al. | .................... | 340/979 |
| 7,106,217 B2 * | 9/2006 | Judge et al. | .................... | 340/973 |
| 7,295,135 B2 * | 11/2007 | Younkin | ....................... | 340/971 |
| 7,616,130 B2 * | 11/2009 | Astruc et al. | .................... | 340/946 |
| 7,626,515 B1 * | 12/2009 | Langner et al. | ................ | 340/971 |
| 7,636,617 B2 * | 12/2009 | Artini et al. | ....................... | 701/3 |
| 8,175,760 B2 * | 5/2012 | Rouquette et al. | ................. | 701/9 |
| 2001/0002817 A1 * | 6/2001 | Berlioz et al. | ................. | 340/978 |
| 2003/0132860 A1 * | 7/2003 | Feyereisen et al. | ........... | 340/973 |
| 2003/0193411 A1 * | 10/2003 | Price | .............................. | 340/973 |
| 2004/0189492 A1 * | 9/2004 | Selk et al. | ...................... | 340/973 |
| 2004/0217883 A1 * | 11/2004 | Judge et al. | .................... | 340/946 |
| 2005/0237226 A1 * | 10/2005 | Judge et al. | .................... | 340/946 |

(Continued)

*Primary Examiner* — Bao Long T Nguyen
(74) *Attorney, Agent, or Firm* — J. Wiley Horton

(57) ABSTRACT

An integrated flight instrument which provides unambiguous information regarding the motion of a hovering aircraft. The instrument accurately depicts motion in six degrees of freedom (roll, pitch, yaw, forward translation, lateral translation, and vertical translation), as well as aircraft power requirements and utilization.

27 Claims, 32 Drawing Sheets

(56) References Cited

U.S. PATENT DOCUMENTS

| | | |
|---|---|---|
| 2007/0085705 A1* | 4/2007 | He et al. .................. 340/967 |
| 2007/0182590 A1* | 8/2007 | Younkin .................. 340/973 |
| 2008/0262664 A1* | 10/2008 | Schnell et al. ............... 701/4 |
| 2009/0138142 A1* | 5/2009 | Still et al. .................. 701/4 |
| 2009/0231163 A1* | 9/2009 | He .......................... 340/946 |
| 2010/0036548 A1* | 2/2010 | Nichols et al. ............. 701/4 |

* cited by examiner

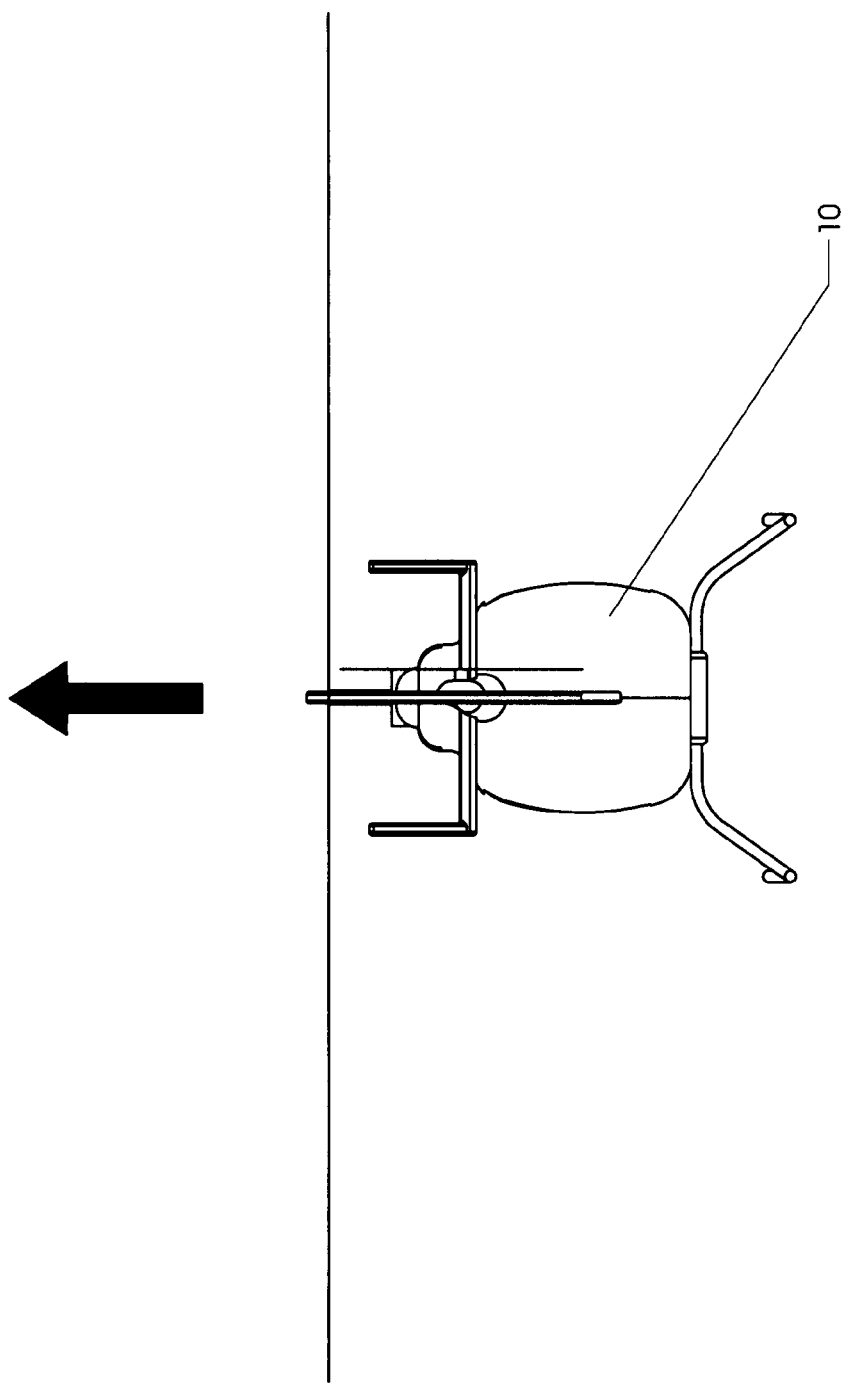

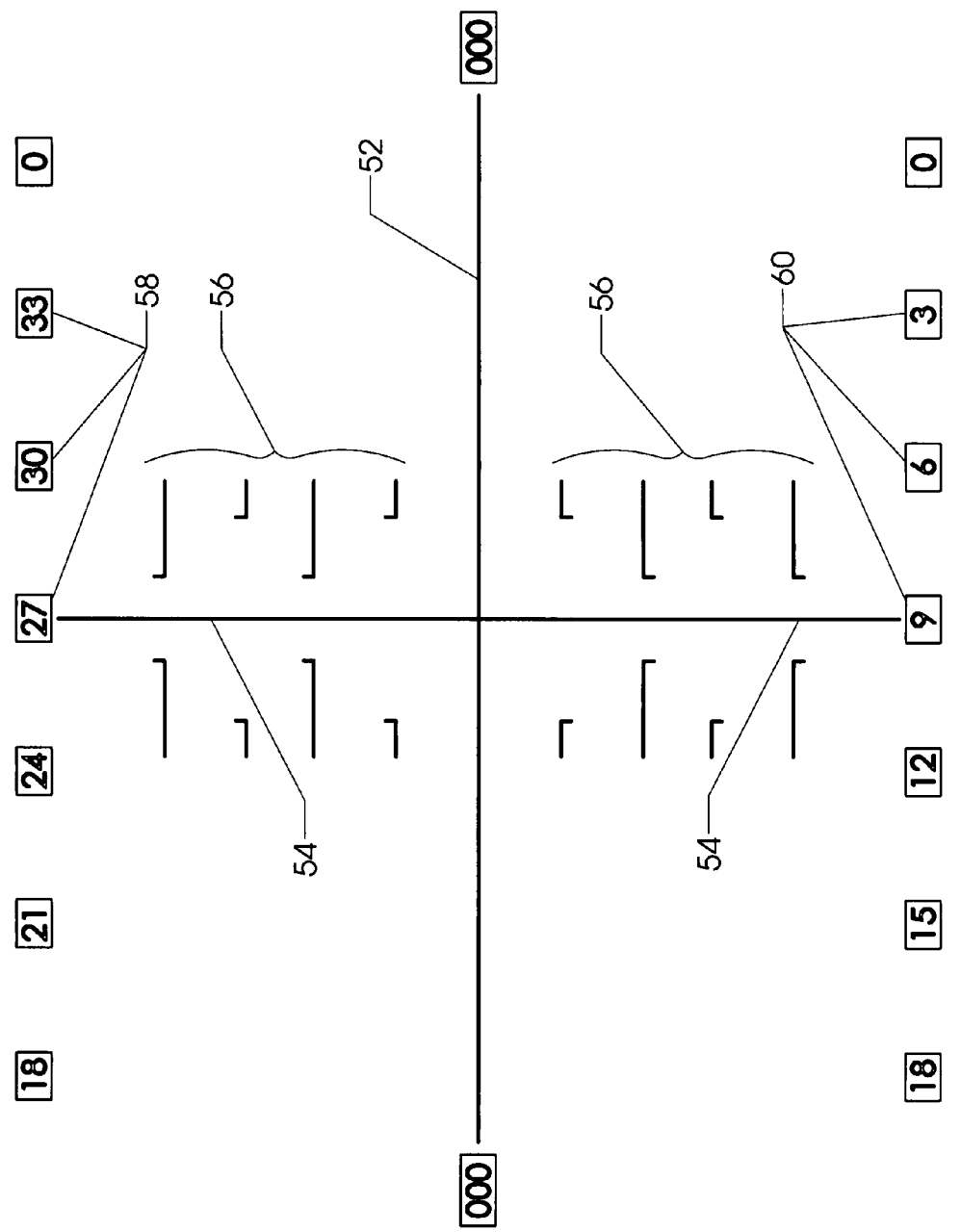

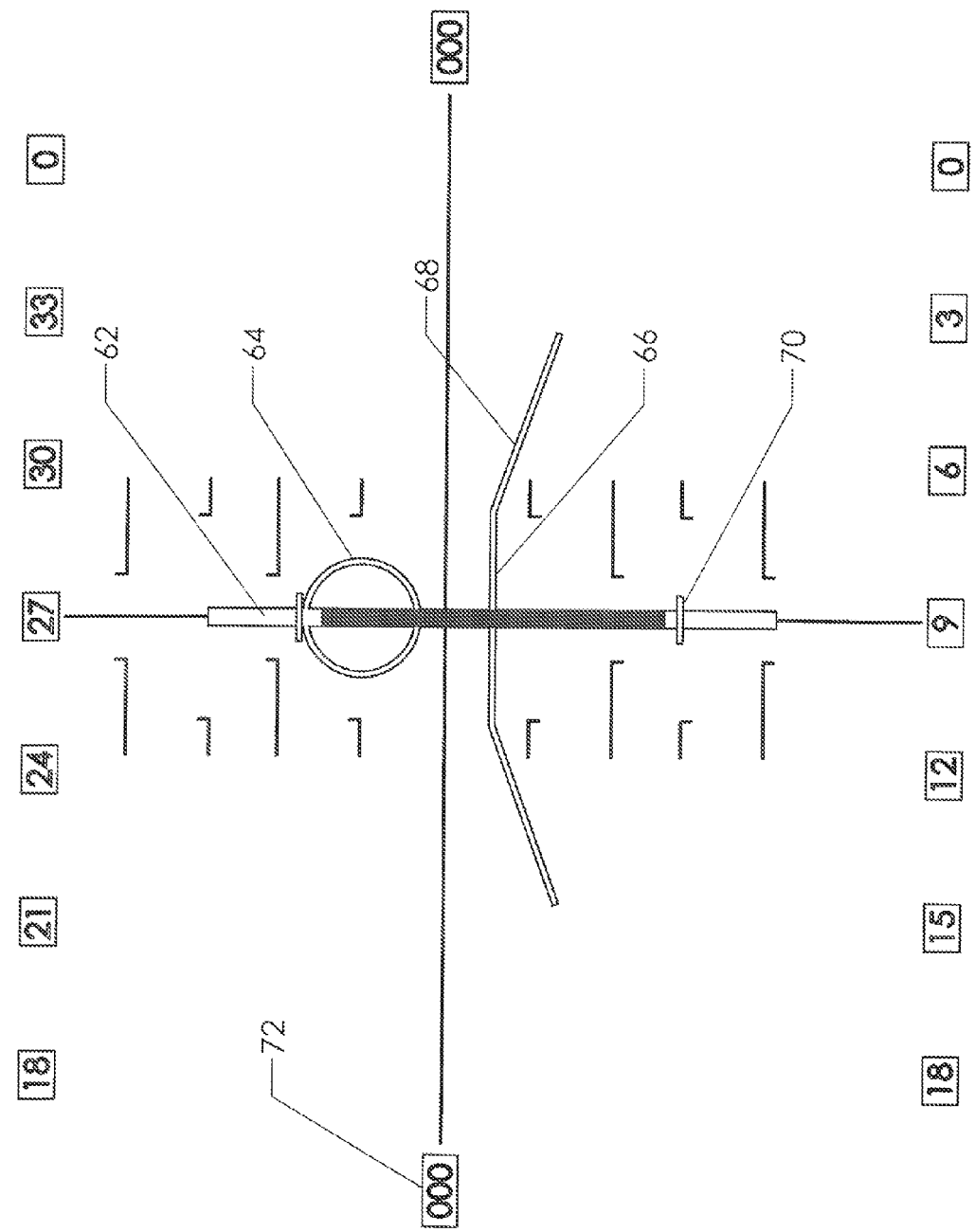

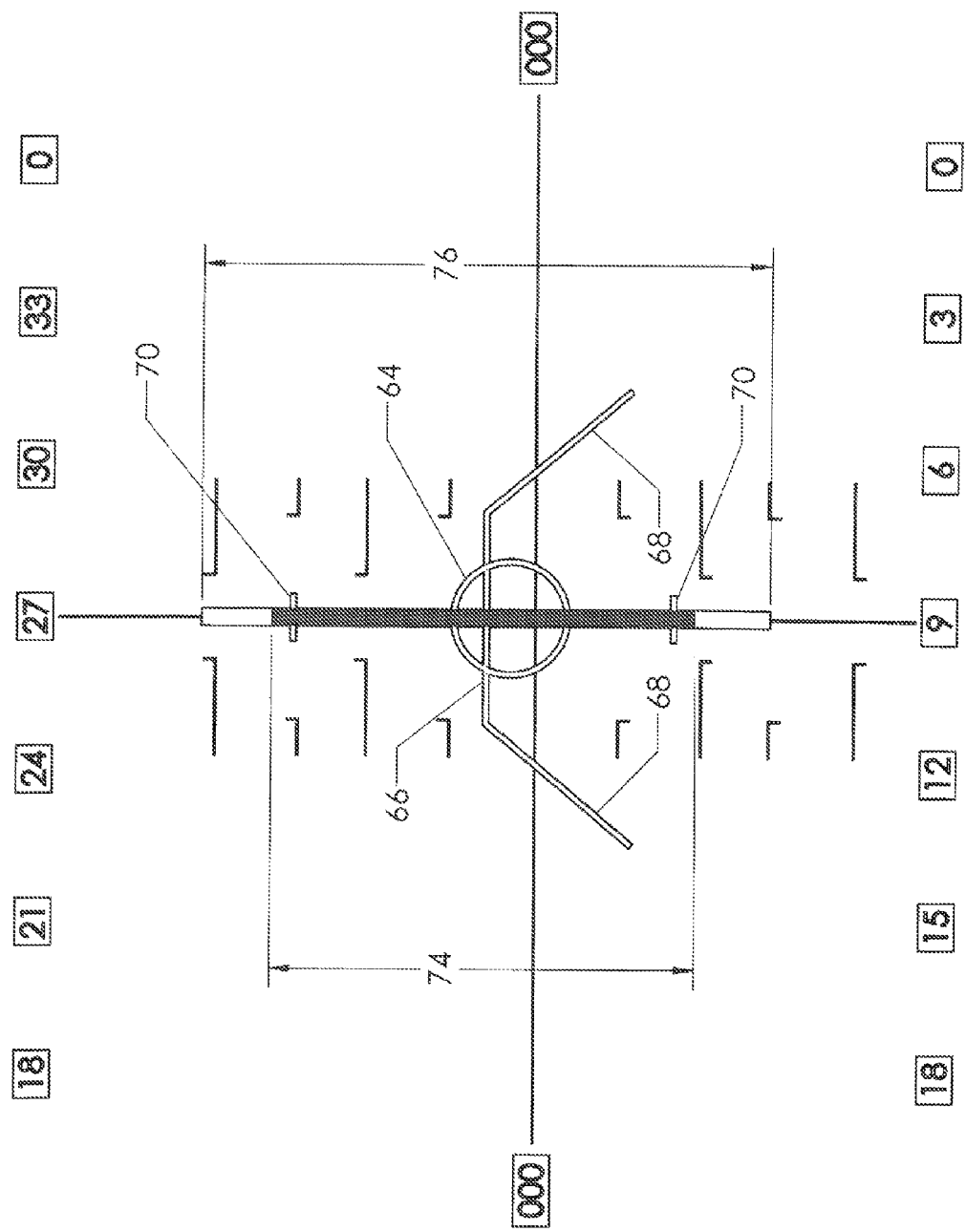

MOTION-RESOLVING HOVER DISPLAY

STATEMENT REGARDING FEDERALLY SPONSORED RESEARCH OR DEVELOPMENT

The invention disclosed herein has been funded at least in part by the federal government.

CROSS-REFERENCES TO RELATED APPLICATIONS

Not Applicable

MICROFICHE APPENDIX

Not Applicable

BACKGROUND OF THE INVENTION

1. Field of the Invention

This invention relates to the field of aviation. More specifically, the invention comprises a flight instrument which clearly displays the attitude and motion of a hovering aircraft to its pilot.

2. Description of the Related Art

The present invention primarily applies to aircraft which are in low-speed or hovering flight. It is useful in conventional rotorwing aircraft such as helicopters and "unconventional" hovering aircraft such as the Bell/Boeing V-22 Osprey and the McDonald Douglass AV-8B Harrier II.

Although the flight dynamics of a hovering aircraft will be familiar to those skilled in the art, a brief explanation of these dynamics may be helpful. Because a helicopter is the most common type of hovering aircraft, it will be used as an example. FIG. 1 shows a prior art helicopter 10, having main rotor 12 and tail rotor 14. FIG. 2 shows a "ghosted" view of the same helicopter with the conventional six degrees of freedom being shown with reference to its center of gravity 16. These six degrees of freedom are: (1) vertical translation 28 along yaw axis 22; (2) forward/rearward translation 26 along roll axis 20; (3) lateral translation 24 along pitch axis 18; (4) roll about roll axis 20; (5) pitch about pitch axis 18; and (6) yaw about yaw axis 22. Other degrees of freedom are typically present, but are not as significant as the six degrees just listed. In order to achieve control in hovering flight, a pilot must control these six significant degrees of freedom.

Those skilled in the art will know that a helicopter pilot controls the aircraft while in a hovering state by: (1) adjusting the collective pitch main rotor control; (2) adjusting the cyclic pitch main rotor control; and (3) adjusting the pitch of the tail rotor (primarily to control yaw). The pilot typically observes objects outside the helicopter to discern the helicopter's motion and then provide appropriate control input. Flight instruments are also available, such as an attitude indicator. An attitude indicator does provide information about the aircraft's roll and pitch states. A separate directional gyro can provide information about the aircraft's yaw state. It is also true that an airspeed indicator provides forward speed and a vertical speed indicator provides information regarding upward and downward motion, but these instruments do not provide an integrated and readily perceived picture of the aircraft's motion, especially the slower motion occurring while hovering.

A controlled hover requires that all three of the aforementioned controls be continually adjusted (as well as the throttle in some circumstances). Hovering is a very difficult task to learn. A student simply does not have time to scan and mentally integrate the currently available flight instruments and—even if a student did have enough time—the current instruments provide only partial information about the aircraft's motion. The result is that many students who are capable of learning to fly a helicopter in the aerodynamic flight regime (flight above approximately 30 mph) fail to master the art of hovering and maneuvering at low speeds.

Computer simulations are now used extensively in flight training, and this has been true for hovering aircraft as well. There was an initial belief that computer simulations could aid the teaching of hovering skills. When this initially proved unsuccessful, the suspected problem was a lack of visual resolution in the simulation. However, as more and more detailed simulations evolved, the problem persisted. It was eventually realized that the problem did not lie in the simulation's ability to mimic the real world, but rather with the fact that the information available to a hovering pilot in the real world is ambiguous. FIGS. 3-6 illustrate this phenomenon.

FIG. 3 shows a pilot's view looking out the front of the helicopter's canopy. The helicopter is hovering over the centerline of a runway having a heading of 270 degrees ("Runway 27"). The pilot can observe many features in the terrain surrounding the helicopter. Examples are runway 36, runway centerline 38, and runway numeral 40. The pilot can perceive the helicopter's motion by observing how these external objects move with respect to the helicopter. Even small motions can be discerned by observing how the external objects appear in relation to fixed portions of the helicopter—such as vertical canopy brace 34, horizontal canopy brace 32, and instrument console 30.

The reader will gain some understanding of these observations by comparing FIG. 4 to FIG. 3. FIG. 4 represents the pilot's view at a slightly later time than FIG. 3. The reader will observe that the runway appears to be "slipping under the nose" of the helicopter. In FIG. 4, runway numeral 40 has been partially occluded by horizontal canopy brace 32. Making this observation is easy. However, understanding what the observation means in terms of the motion of the helicopter is much more difficult.

Observing that objects in front of the helicopter appear to be "slipping under the nose" can mean three different things. These are shown in FIGS. 4A-4C. The helicopter can be: (A) ascending; (B) moving forward; and/or (C) pitching upward. Of course, in many instances, the motion will actually be a combination of these phenomena. Referring to the aircraft state diagram shown in FIG. 2, ascending would be vertical translation 28, moving forward would be forward translation 26, and pitching upward would be pitching about pitch axis 18.

The same problem exists when looking at objects out the side of the helicopter. FIG. 5 shows the pilot's view out side window 42. The pilot can observe many external objects, such as runway 36, taxiway 46, runway boundary 48, and runway threshold markers 44. The motion of these external objects can be observed with respect to the frame of the window and side canopy brace 50. FIG. 6 shows the same view a short time later. The reader will observe that the external objects appear to be slipping beneath the right side of the helicopter. However, as for the case of looking out the nose of the helicopter, these lateral visual cues are ambiguous.

Observing that objects to the right of the helicopter appear to be "slipping under the side" can mean three different things. FIG. 7 illustrates these possibilities. The helicopter can be: (A) ascending; (B) translating to the right; and/or (C) rolling to the left. Again returning to FIG. 2, the possible motions correspond to vertical translation 28, lateral translation 24, and/or rolling about roll axis 20. The motion will again likely be a combination of two or more of the possibilities. Resolving the ambiguity is an exceedingly complex task.

Similar visual ambiguities occur when making observations out the left side of the helicopter, and when trying to discern rearward motion. An experienced pilot is able to resolve these ambiguities, though the present view is that different pilots likely use different techniques to do so. There is no clearly defined method for teaching these skills. Instead, an instructor pilot ("IP") usually gives the student control of only one input parameter while the IP controls the rest. As an example, the IP often controls the throttle, the collective pitch control, and the rudder pedals. The student would then be given command of the cyclic pitch control. The student hopefully masters the skill of hovering for each of the controls. More and more control authority is given to the student until he or she is able to control all the input parameters while performing hover maneuvers. Of course, some student pilots are ultimately unable to master this skill.

Those skilled in the art will know that helicopters and other hover-capable aircraft include a battery of flight instruments. A typical instrument cluster would include an attitude indicator, an airspeed indicator, a vertical speed indicator, a gyro compass, and a turn/slip indicator. These instruments are certainly useful, but they do not resolve the motion ambiguities present during hover maneuvers. The pilot must also continually scan the instruments in order to mentally integrate the information they are displaying. In a hover maneuver, there is rarely enough time to perform such a scan and mental integration.

In addition, even if the scan and mental integration step could be performed rapidly enough, existing flight instruments simply do not provide enough information for hovering maneuvers. As one example, they provide no indication of lateral translation. It is therefore desirable to provide a flight instrument which provides clear information about the motion and attitude of the aircraft during hovering maneuvers. The present invention provides such a flight instrument.

BRIEF SUMMARY OF THE INVENTION

The present invention is an integrated flight instrument which provides clear information regarding the attitude and motion of a hovering aircraft. The instrument accurately depicts motion in six degrees of freedom (roll, pitch, yaw, forward/rearward translation, lateral translation, and vertical translation). It also provides information about the aircraft's power requirements and settings.

The instrument includes two main components—an external reference display and an aircraft metaphor. The external reference display features a horizon line and two lubber lines which are perpendicular to the horizon line. The horizon line functions in the same manner as a conventional attitude indicator. The lubber lines include positive and negative pitch ladders, which again are similar to some of the references found in attitude indicators. Forward headings and rearward headings are also preferably displayed as part of the external reference display.

The aircraft metaphor includes several distinct components. A vertically-oriented power bar depicts the aircraft's roll state. In the case of a helicopter, the power bar is also used to depict the maximum available main rotor torque, the current amount of torque being applied (as a function of the collective pitch control setting), and the amount of torque needed to hover inside of ground effect.

A pitch line—which moves up and down with respect to the horizon—depicts the aircraft's pitch state. The aircraft's yaw state is displayed by forward and rearward heading indicators, which translate across the instrument as the aircraft yaws.

Two pivoting "arms" extend outward from each end of the pitch line. These fold downward to indicate forward translation and upward to indicate rearward translation. The power bar and the aircraft metaphor translates right and left of the vertical lubber lines to depict lateral translation. A circular "ball" translates up and down with respect to the horizon to indicate vertical translation of the aircraft. Other features are preferably provided as well. These will be explained subsequently.

BRIEF DESCRIPTION OF THE SEVERAL VIEWS OF THE DRAWINGS

FIG. 7A is an elevation view, showing a helicopter in vertical translation.

FIG. 8 is a graphical view, showing the external reference display incorporated in the present invention.

FIG. 9 is a graphical view, showing the aircraft metaphor placed over the external reference display.

FIG. 10 is a graphical view, showing how the power bar displays the maximum available main rotor torque and the current torque setting.

Figure 1:
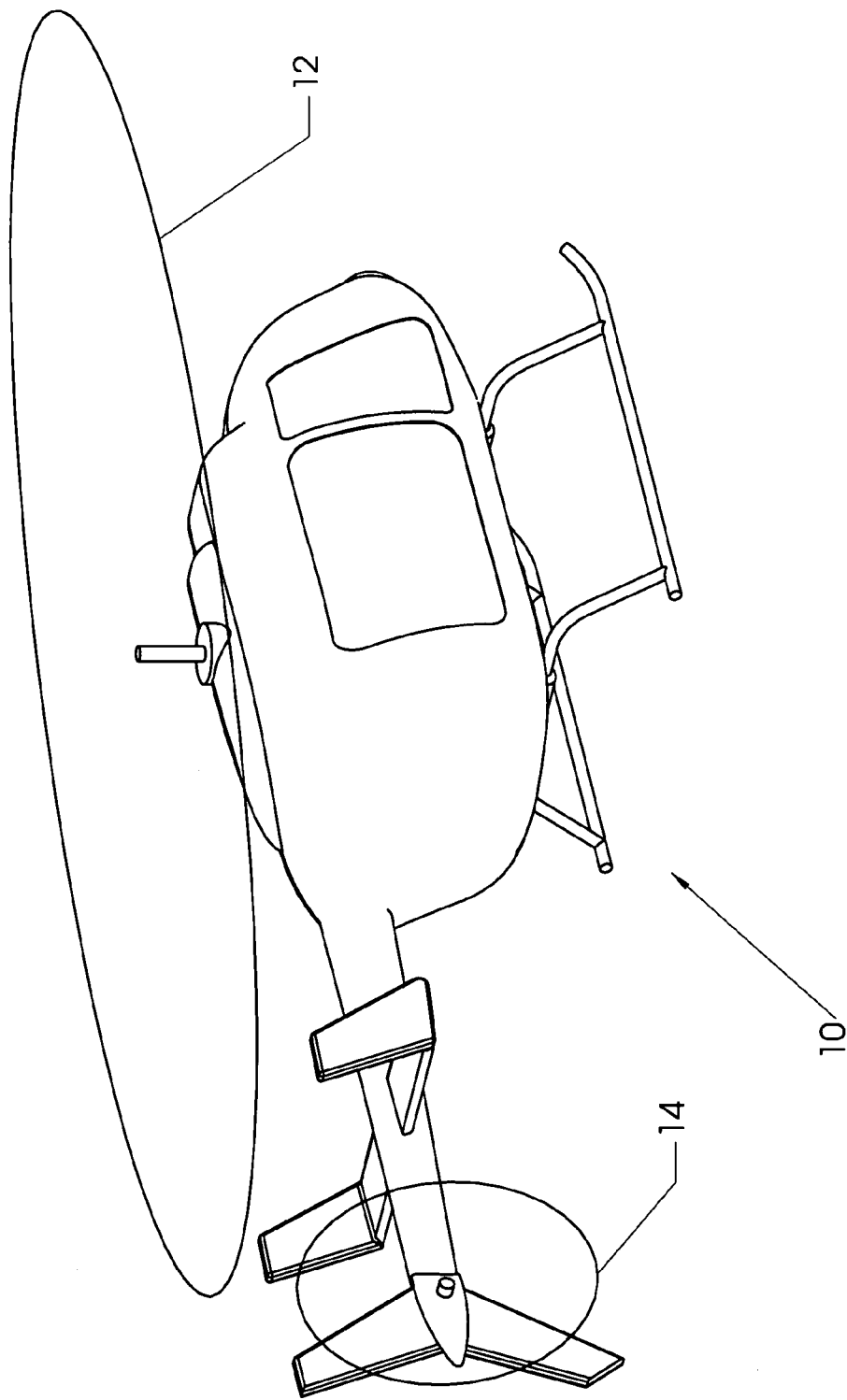
FIG. 1 is a perspective view, showing a prior art helicopter.
Figure 2:
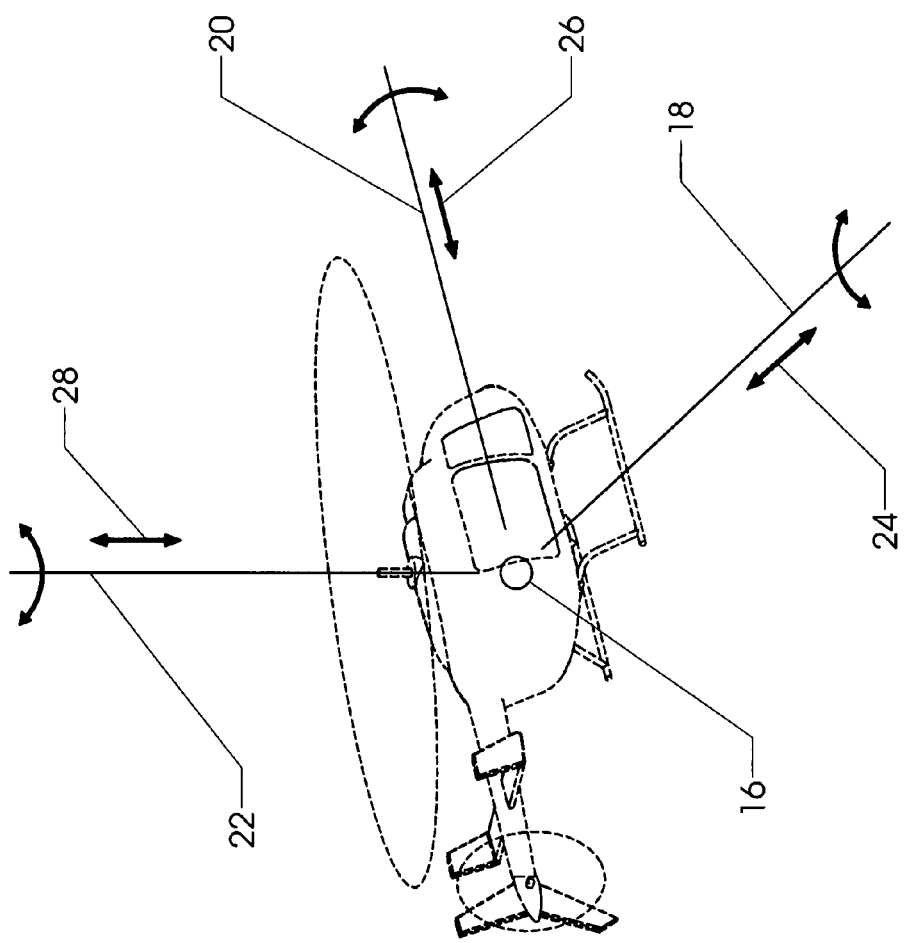
FIG. 2 is a perspective view, showing the six degrees of freedom conventionally used to describe the motion of an aircraft.
Figure 3:
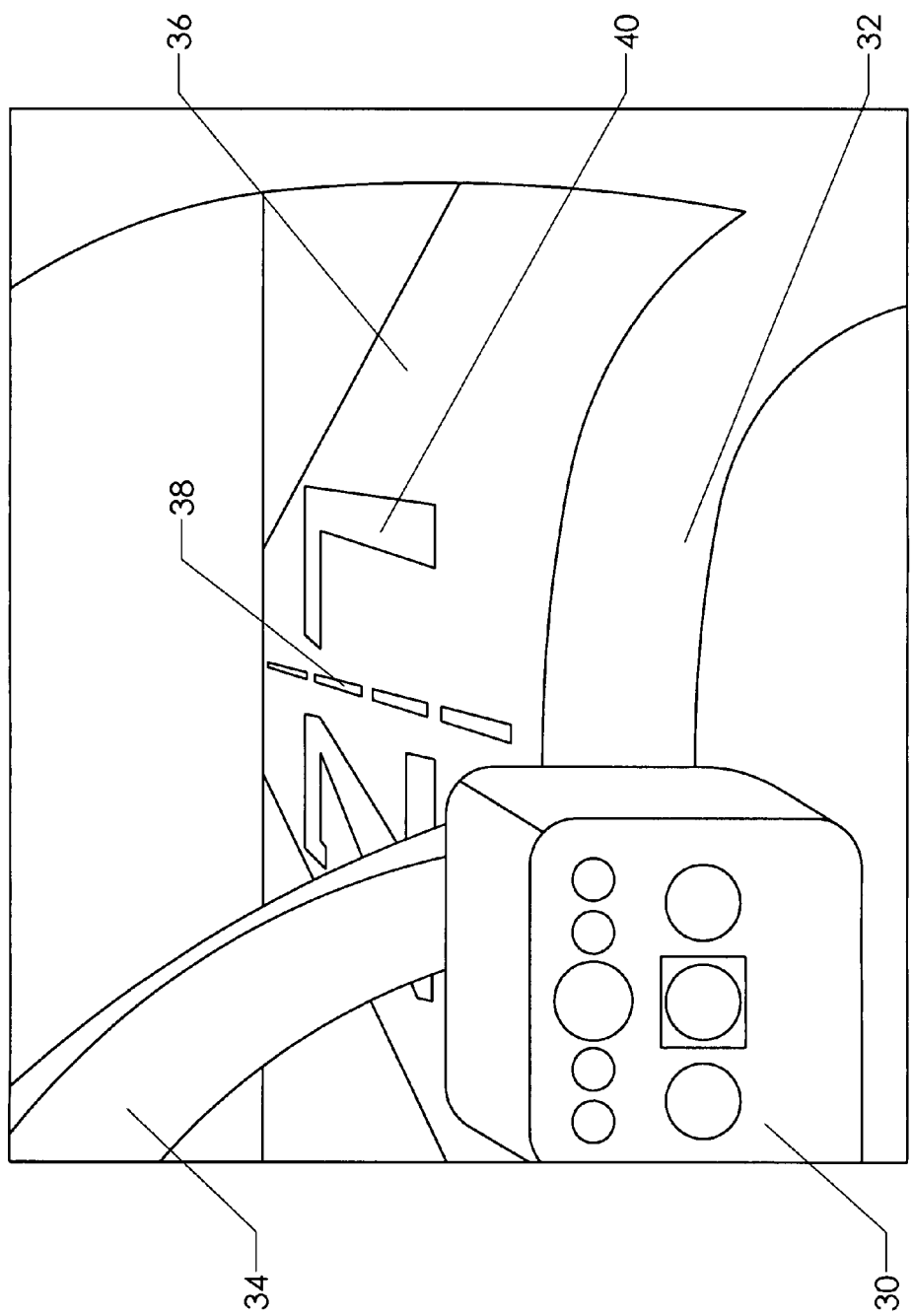
FIG. 3 is a perspective view, showing a pilot's view of external objects out of a helicopter's forward canopy.
Figure 4:
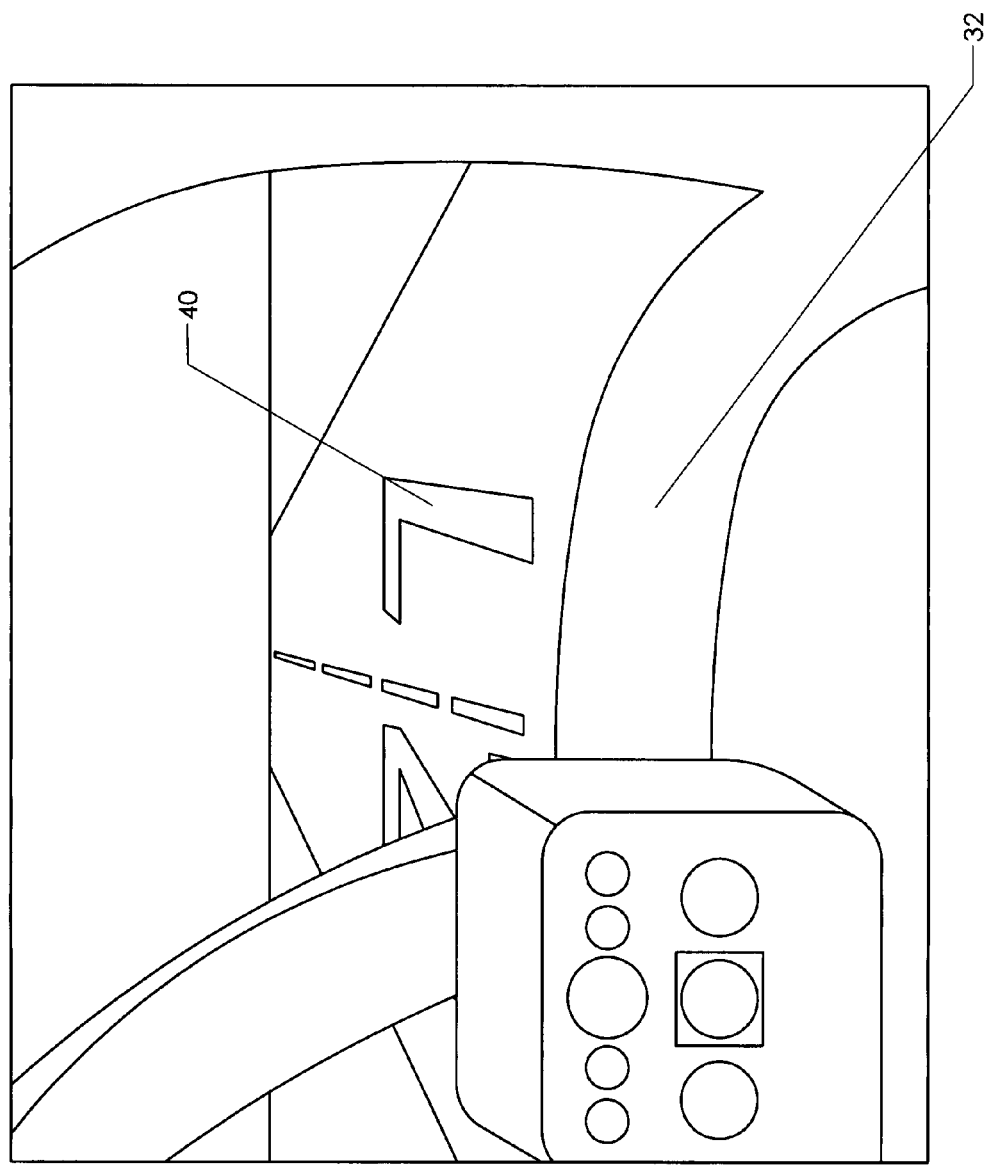
FIG. 4 is a perspective view, showing the image of FIG. 3 a short time later.
Figure 4A:
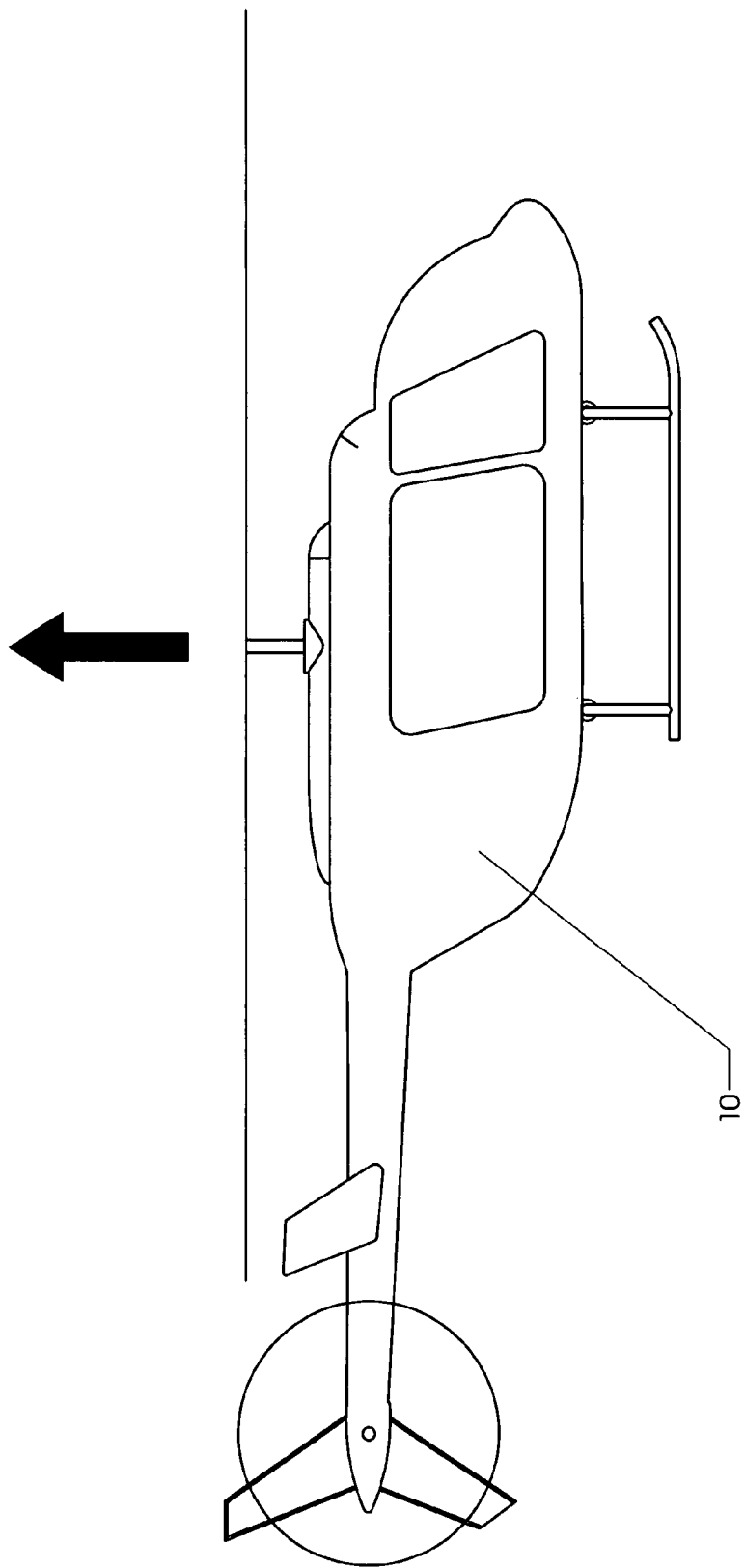
FIG. 4A is an elevation view, showing a helicopter in vertical translation.
Figure 4B:
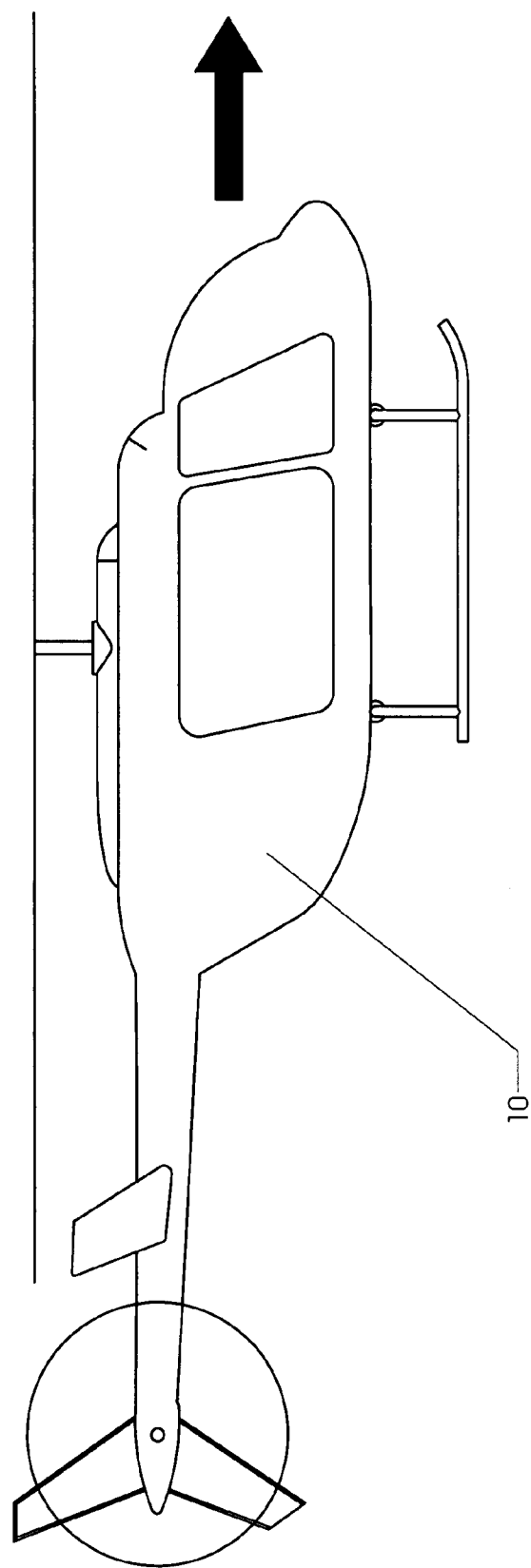
FIG. 4B is an elevation view, showing a helicopter in forward translation.
Figure 4C:
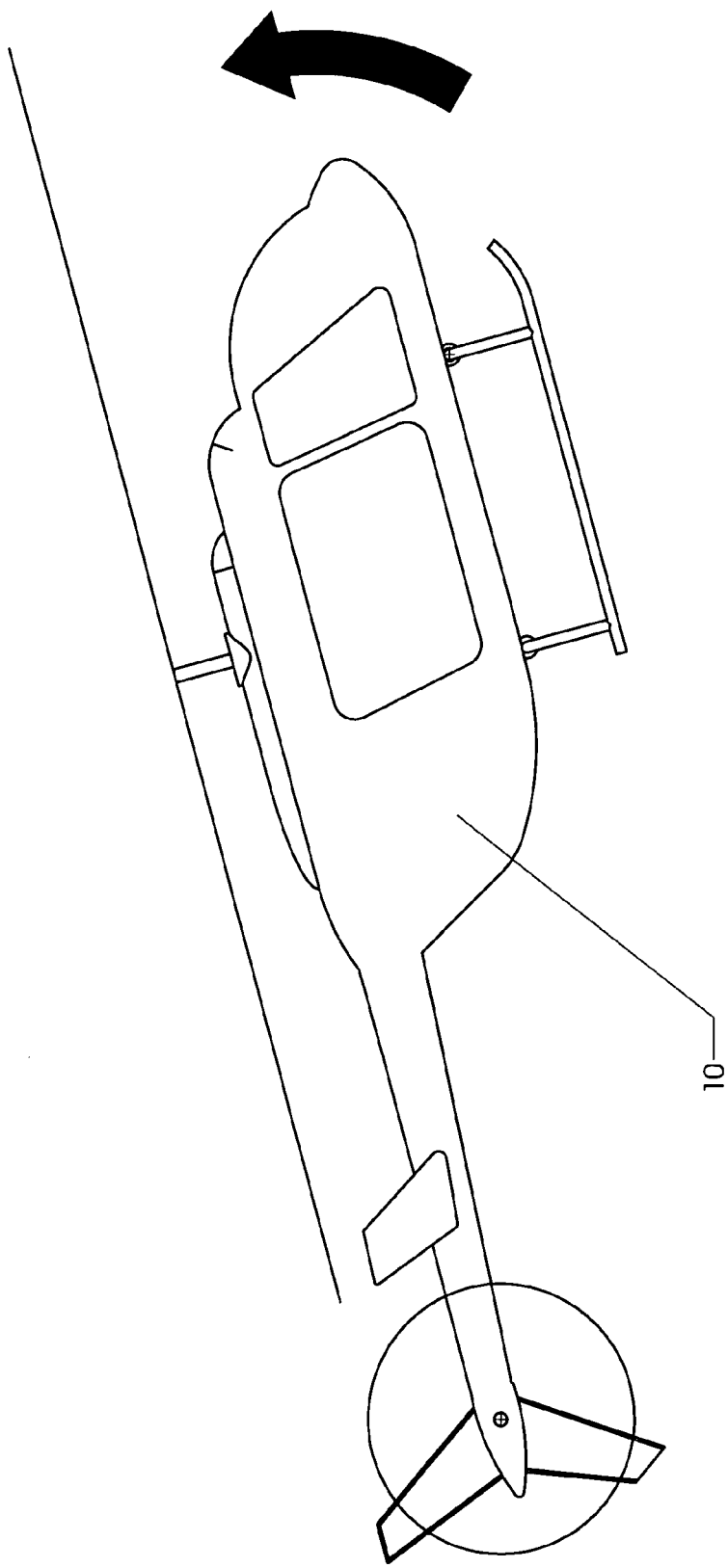
FIG. 4C is an elevation view, showing a helicopter pitching upward.
Figure 5:
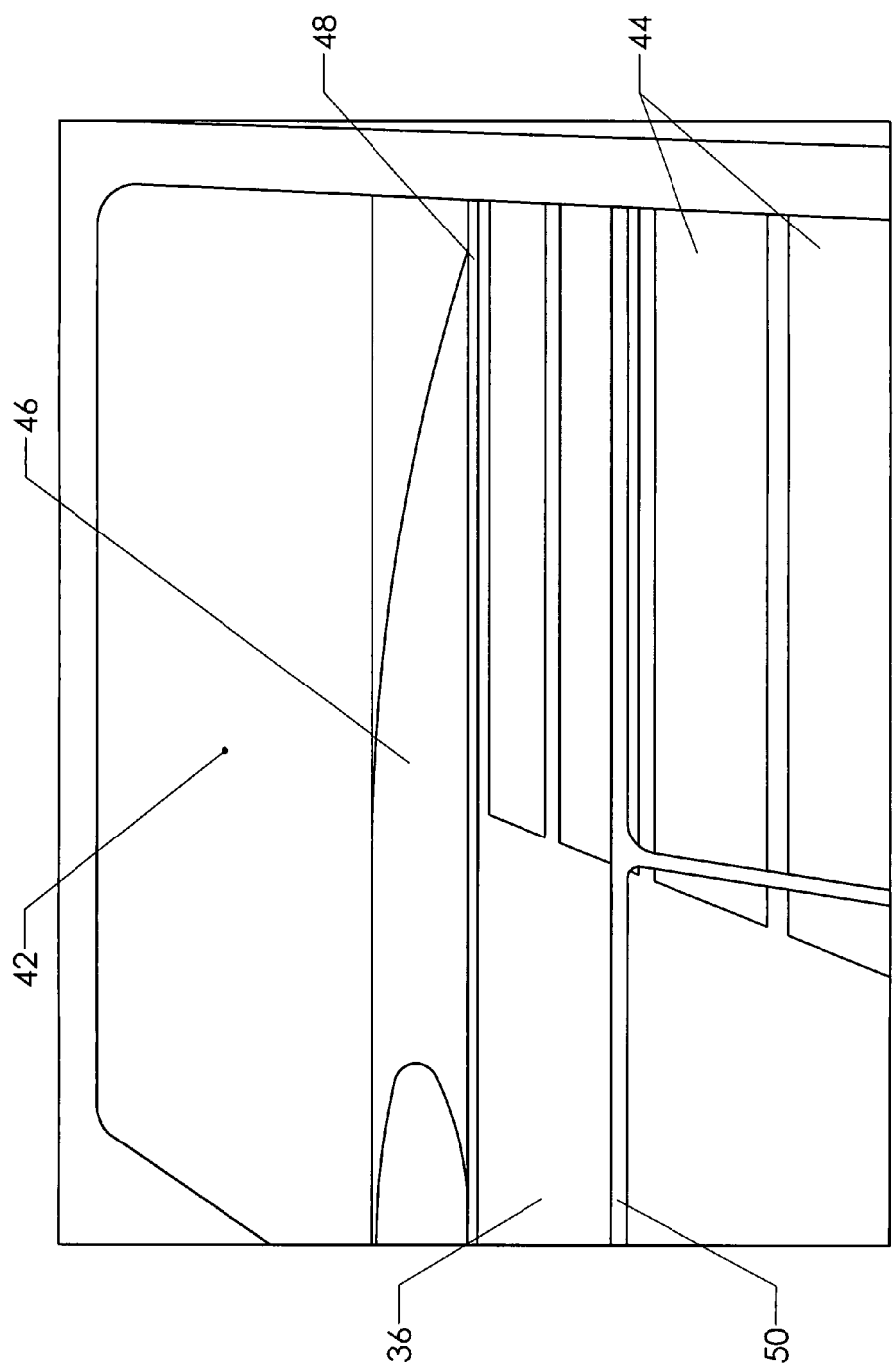
FIG. 5 is a perspective view, showing a pilot's view of external objects out of a helicopter's side window.
Figure 6:
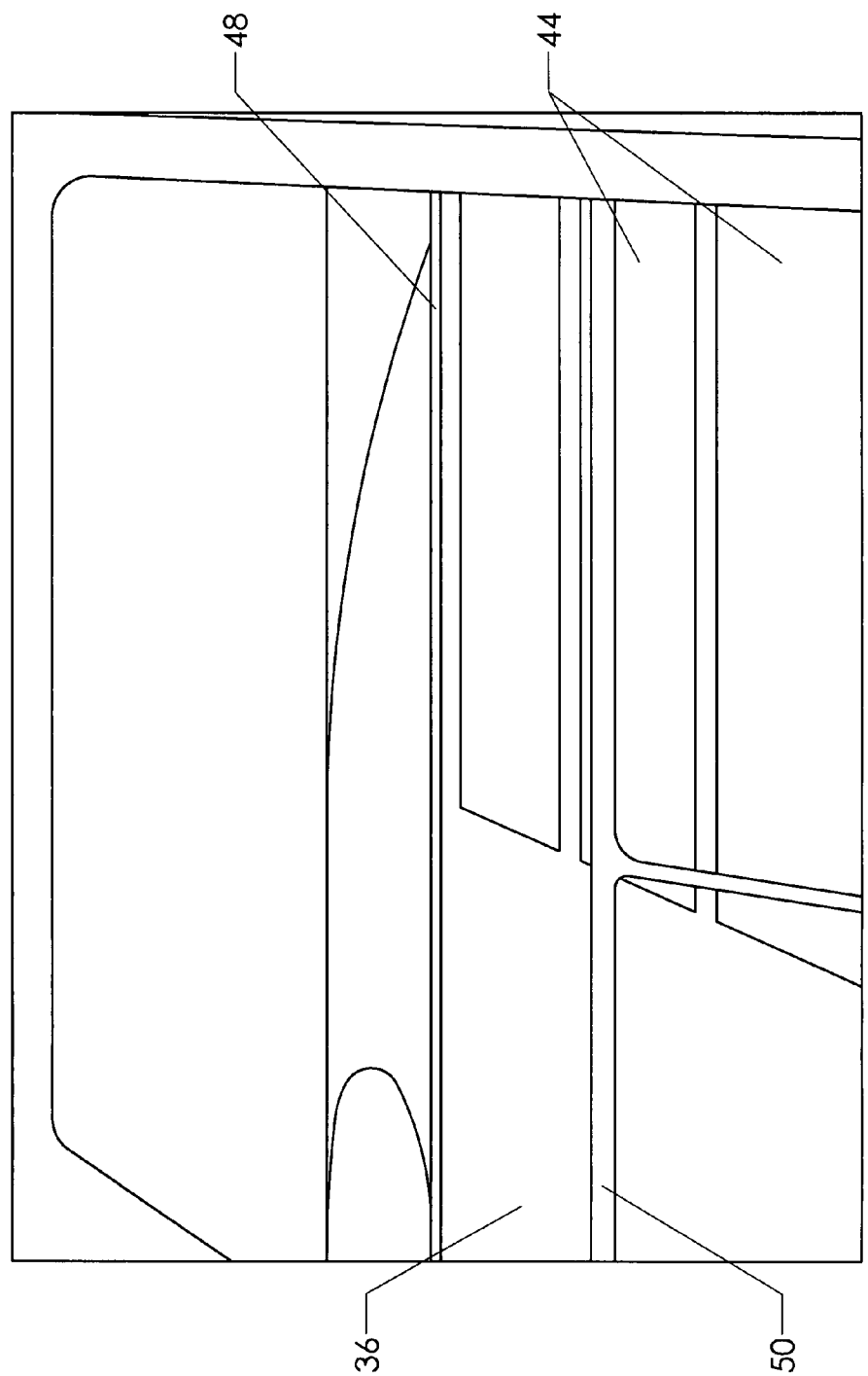
FIG. 6 is a perspective view, showing the image of FIG. 5 a short time later.
Figure 7B:
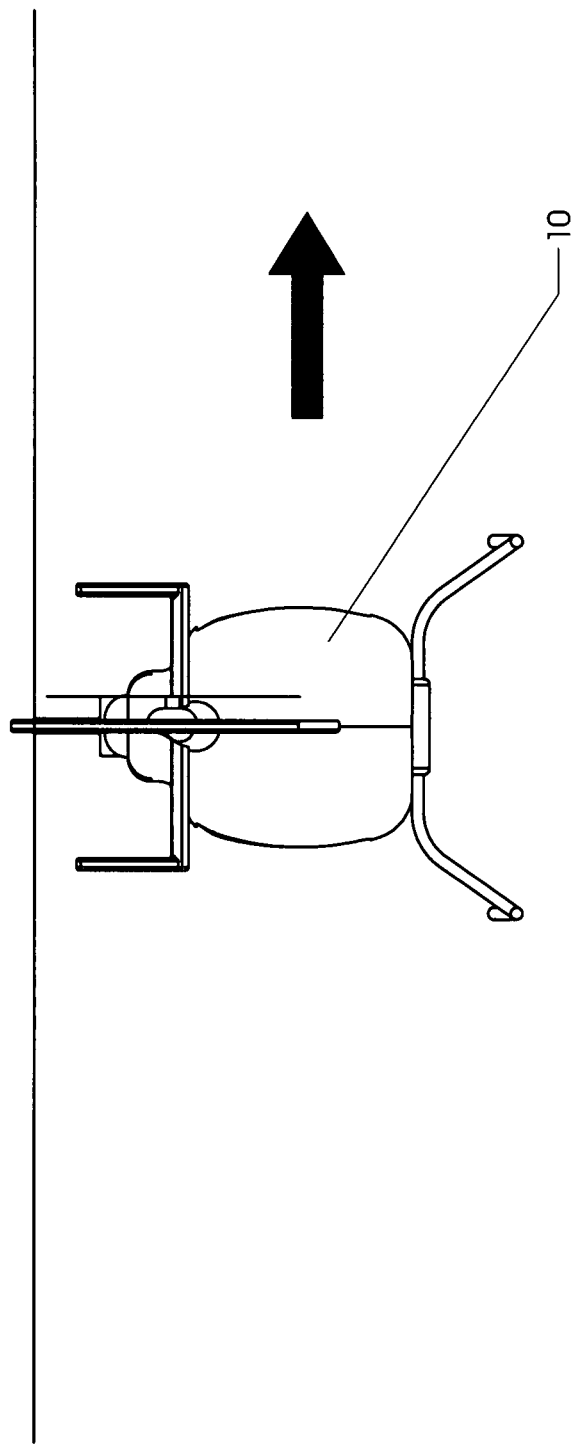
FIG. 7B is an elevation view, showing a helicopter in lateral translation.
Figure 7C:
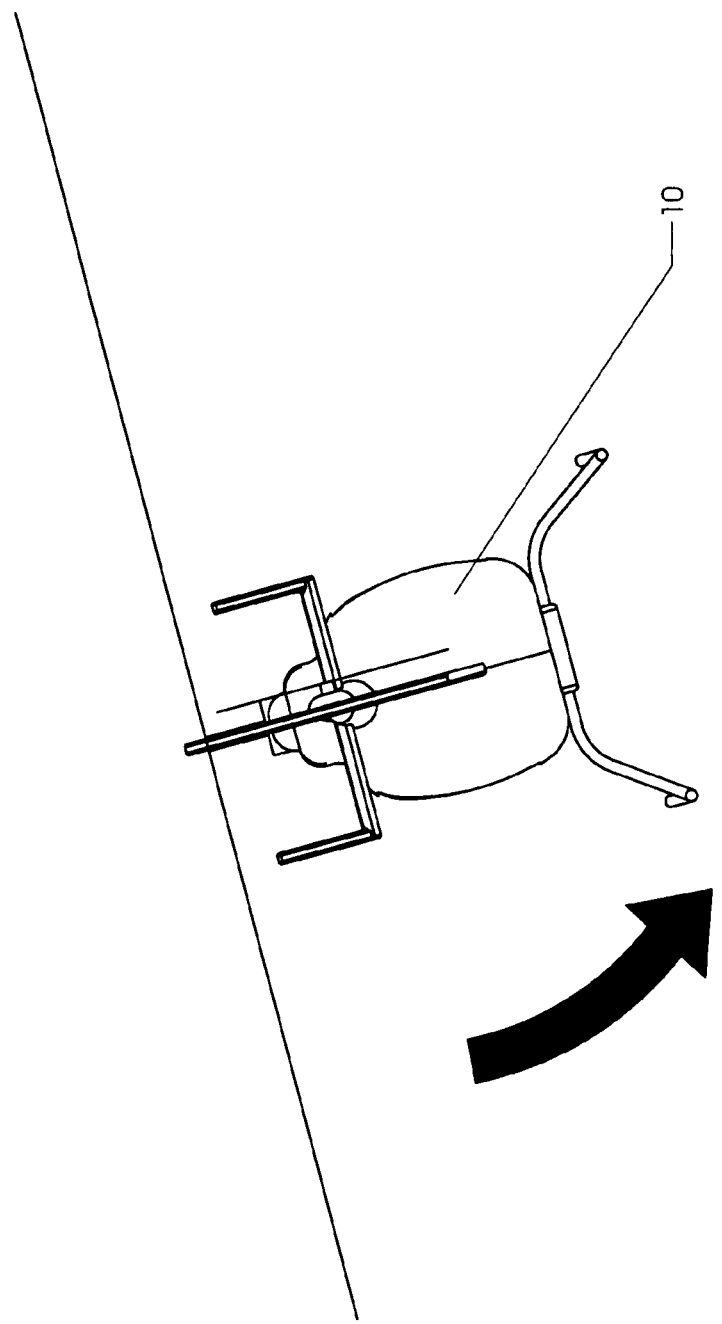
FIG. 7C is an elevation view, showing a helicopter rolling left.

REFERENCE NUMERALS IN THE DRAWINGS 10 helicopter
12 main rotor
14 tail rotor
16 center of gravity
18 pitch axis
20 roll axis
22 yaw axis
24 lateral translation
26 forward/rearward translation
28 vertical translation
30 instrument console
32 horizontal canopy brace
34 vertical canopy brace
36 runway
38 runway centerline
40 runway numeral
42 side window
44 runway threshold marker
46 taxiway
48 runway boundary
50 side canopy brace
52 horizon line
54 lubber line
56 pitch ladder
58 forward heading
60 rearward heading
62 power bar
64 vertical speed ball
66 pitch line
68 arm
70 hover tick
72 altitude (AGL)
74 current torque
76 maximum available torque
78 hash mark
80 feather tips
82 roll angle
84 lateral velocity
86 first forward speed
88 extended forward speed
90 main rotor RPM bar
92 power bar tip

DETAILED DESCRIPTION OF THE INVENTION

The present invention is a flight instrument designed to provide a wealth of information to a pilot flying an aircraft, particularly when the aircraft is performing hover maneuvers. The flight instrument will be referred to as a "hover display." The hover display could be physically realized in many different ways. However, as the use of flat-panel electronic displays is now common in aviation, an embodiment using this approach will be described. Those skilled in the art will know that such flat panels can be constructed using LCD's, plasma displays, and the like. The physical construction of such components is well beyond the scope of this disclosure, and in any event well understood by those with knowledge of avionics.

FIG. 8 shows the first portion of the display, which will be referred to as the external reference display. It is conceptually similar to prior art attitude indicators, which are also sometimes known as "artificial horizons." Horizon line 52 represents the earth's horizon. A first lubber line 54 extends upwards from horizon line 52 in a direction perpendicular to horizon line 52. A second lubber line 54 extends downward from horizon line 52. Each lubber line includes a pitch ladder 56, which delineates the degree of upward or downward aircraft pitch with respect to the horizon.

A series of forward headings 58 are arrayed across the top of the display, while a series of rearward headings 60 are arrayed across the bottom. Aircraft headings are generally abbreviated. Thus, a heading of 270 degrees is shown as "27" while a heading of 300 degrees is shown as "30." In the example shown in FIG. 8, the aircraft's current heading is shown as "27," which indicates 270 degrees. To the right of the current heading is the heading of "30," while to the left is the heading of "24." These objects scroll laterally as the aircraft's heading changes.

The rearward headings 60 arrayed across the bottom of the display reflect the headings behind the aircraft. The heading directly behind the aircraft is "9" or 90 degrees. The forward headings and reverse headings scroll laterally as the aircraft's heading changes. If the aircraft turns right to a heading of "30" then the forward headings will appear to scroll to the left until the "30" lies directly above the upper lubber line 54. Likewise, the rearward headings will appear to scroll right until the "12" lies directly below the lower lubber line 54.

All the objects thus described move in a fashion similar to a conventional attitude indicator/gyro compass. If the aircraft rolls right, all the objects will rotate in a counterclockwise direction. If the aircraft rolls left, all the objects will rotate in a clockwise direction. If the aircraft pitches up, the objects will move down (though the headings preferably do not move up and down). If the aircraft pitches down, the objects will move up.

FIG. 9 shows the aircraft metaphor superimposed over the external reference display. Power bar 62 represents the aircraft's roll with respect to the external reference display (as well as other features which will be described subsequently). If the aircraft rolls right, the power bar will remain vertical while the external reference display will rotate counterclockwise. If the aircraft rolls left, the external reference display will rotate clockwise with respect to power bar (in a fashion similar to prior art attitude indicators).

Pitch line 66 represents the aircraft's pitch with respect to the external reference display. If the aircraft pitches up, the external reference display will move down with respect to pitch line 66. If the aircraft pitches down, the external reference display will move up with respect to pitch line 66. The degree of pitch can be easily determined by comparing the position of pitch line 66 against one of the two pitch ladders 56.

The lateral motion of forward headings 58 and rearward headings 60 represent the aircraft's yaw. If the aircraft yaws left, then the forward headings will scroll to the right while the rearward headings will scroll to the left. If the aircraft yaws right, then the forward headings will scroll left while the rearward headings will scroll right.

The motion of the two arms 68—one on each end of pitch line 66—reflects the aircraft's forward and rearward translation. When they bend downward—as shown in FIG. 9—the aircraft is translating forward. When they bend upward, the aircraft is translating rearward. The arms bend further downward with increasing forward speed and further upward with increasing rearward speed.

The motion of vertical speed ball 64 reflects the aircraft's vertical speed. If there is no vertical translation, then the center of vertical speed ball 64 is centered on the horizon line. If the aircraft begins to ascend, the center of the vertical speed ball moves upward away from the horizon line. Its degree of upward movement is proportional to the ascent rate. If the aircraft descends, the vertical speed ball moves downward, with its degree of downward movement again being proportional to the aircraft's descent rate.

Other features can be provided as well. Altitude above ground level ("AGL") 72 is displayed at the left and right extremes of the horizon line. In hovering operations, AGL is much more important than the altitude above sea level. Likewise, the exact heading can be shown at the top and/or bottom of the two lubber lines. Thus, if the upper lubber line is mid-way between the "27" and "30" forward heading displays, the number "285" could be displayed at the top of the upper lubber line.

The reader will thereby understand how the objects depicted in FIG. 9 provide the pilot unambiguous information regarding the aircraft's six degrees of freedom. The relationship of each object to a particular degree of freedom is as follows: (1) Roll—depicted by the rotation of the external reference display with respect to power bar 62; (2) Pitch—depicted by the vertical translation of the external reference display with respect to pitch line 66; (3) Yaw—depicted by the lateral scrolling of the forward and rearward headings; (4) Fore/Aft Translation—depicted by the bending of arms 68; (5) Lateral Translation—depicted by the lateral displacement of power bar 62 and the aircraft metaphor; and (6) Vertical Translation—depicted by the vertical displacement of vertical speed ball 64.

The power bar can be used to depict other information as well. FIG. 10 illustrates some of these additional features. The total vertical height of the power bar indicates the maximum torque 76 that is available for the main rotor under the current conditions. The torque that is currently being applied is depicted as a contrasting object "filling up" the total height of the power bar (current torque 74 in the view). If, as an example, the pilot pulls up on the collective pitch control, current torque 74 will expand outward (both upward and downward) to "fill" a greater portion of the available maximum torque 76. Two hover ticks 70 are provided. These indicate the amount of torque needed to maintain a stable hover inside of ground effect. Thus, while in ground effect, if torque extending beyond the hover ticks is added, the aircraft will ascend.

The "current conditions" reflected in the height of the power bar preferably include most if not all factors affecting the aircraft's performance. These would include air density, aircraft weight and balance (including fuel burn), and current engine conditions. The two hover ticks preferably include the option of the upper and lower tick being set independently. The upper tick could then be set to reflect the current conditions and the lower tick could be set to reflect a "what if" scenario. The pilot would then be able to instantly see if a stable hover is possible using the available torque under the "what if" scenario.

A good example is a "medivac" helicopter considering landing in a deep canyon. If the canyon is small, the pilot will have to use hovering flight to exit. The air temperature at the bottom of such a canyon—under certain conditions—may be as much as 20 degrees Fahrenheit above that of the atmosphere outside the canyon. Thus, the air density on the canyon floor will be lower. The pilot can set the lower portion of the display to the atmospheric conditions known to exist on the canyon floor. The graphical display will then immediately indicate whether an ascent based strictly on hover is possible. Additional ticks can be added to the display for specific flight tasks.

The drawing figures show the objects within the flight instrument as black lines on a white background. In reality, the objects would likely be brightly colored regions on a dark background, as part of a "glass cockpit" display. Another option would be to have the background below the horizon line appear as brown while the background above the horizon line appears as blue. Thus, the drawings should properly be viewed as conceptual illustrations rather than depictions of how the hover display would actually appear.

Figure 11:
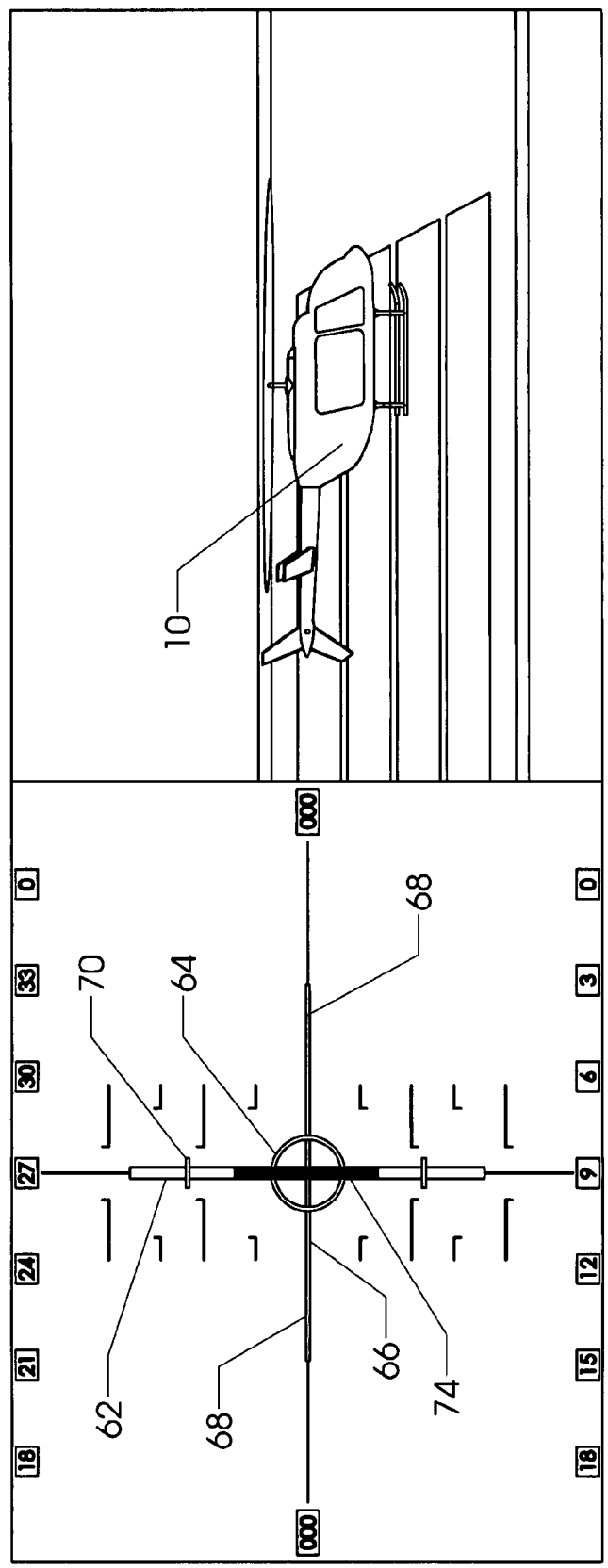
FIG. 11 is a combined graphical and perspective view, showing a helicopter stable on the ground and the corresponding flight instrument display.

The operation of the flight instrument will now be described during several typical hover maneuvers. FIG. 11 is a combined view. The right-hand portion shows a perspective view of a helicopter, while the left-hand portion shows the hover display. The objects within the hover display reflect the current state of the helicopter shown in the adjacent perspective view (as will be true for FIGS. 12-25).

In FIG. 11, helicopter 10 is stable on the runway. Its rotors are turning, but the collective pitch is insufficient to lift the helicopter off its skids. The hover display shows this, as the dark band labeled as current torque 74 is well inside the two hover ticks 70. The reader will note that much more main rotor torque is available (the full height of power bar 62). The reader will also note that it is possible for the helicopter to lift straight off the runway, since the power bar extends well beyond the hover ticks. Vertical speed ball 64 is centered, indicating no ascent or descent. Pitch line 66 is centered as well. Arms 68 are parallel to the pitch line, since there is no forward or rearward translation. The altitude (AGL) displays (the boxes located on the right and left ends of the horizon line) read "000," indicating that the helicopter is sitting on the ground.

Figure 12:
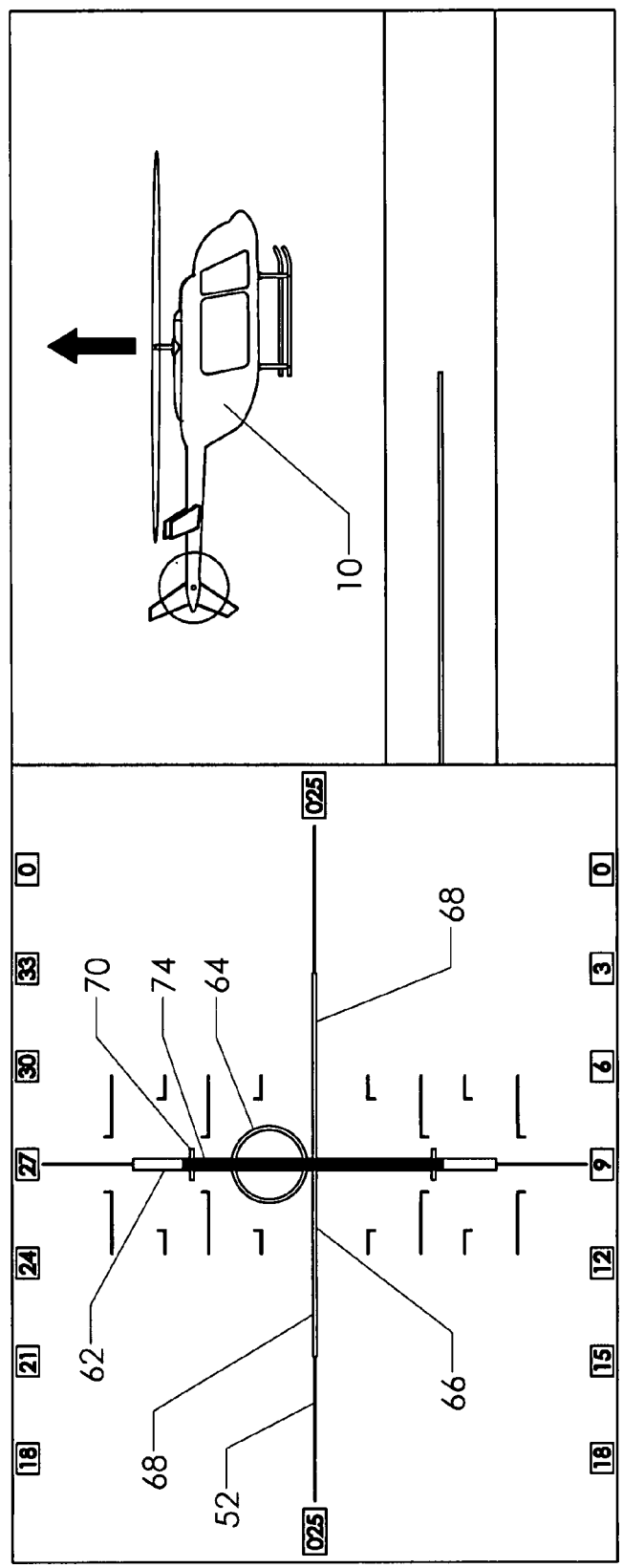
FIG. 12 is a combined graphical and perspective view, showing a helicopter rising vertically from the ground and the corresponding flight instrument display.

In FIG. 12, the pilot has pulled up on the collective pitch control to increase the collective pitch of the main rotor. Current torque 74 has expanded beyond the hover ticks 70. As expected, helicopter 10 has lifted off the runway and started to ascend. Vertical speed ball 64 has translated upward in the hover display to reflect the ascent rate. The helicopter has not pitched or begun to move forward, so pitch line 66 and arms 68 have not moved. The reader will note that the altitude (AGL) display (on either end of the horizon line) now indicates "025," or 25 feet above the ground.

Figure 13:
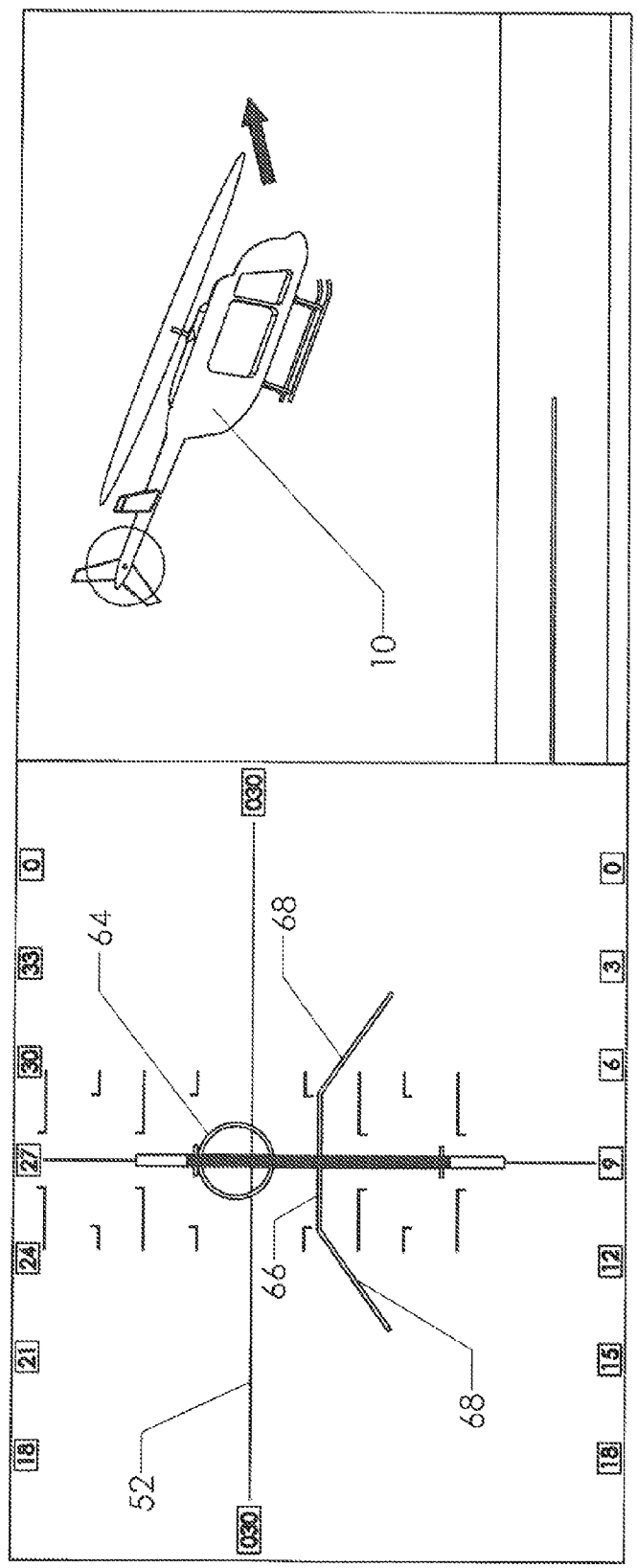
FIG. 13 is a combined graphical and perspective view, showing a helicopter ascending from the ground and gaining forward momentum, and the corresponding flight instrument display.

In FIG. 13, the pilot has gained a bit more altitude and initiated a transition to forward flight. The pilot has pushed forward on the cyclic pitch control to pitch the helicopter's nose down. In the hover display, the reader will note that pitch line 66 has moved well below the horizon line. This tilts the main rotor so that some of its lifting vector is directed forward. The forward component then accelerates the helicopter forward. The hover display shows arms 68 bending downward to indicate increasing forward velocity. The power bar is still centered and perfectly vertical, indicating no side-slip and no roll. This is actually a bit unrealistic, since most maneuvers will encompass combined motion. However, for purposes of visual simplicity, FIG. 13 assumes a perfectly executed maneuver with no unwanted motion.

Figure 14:
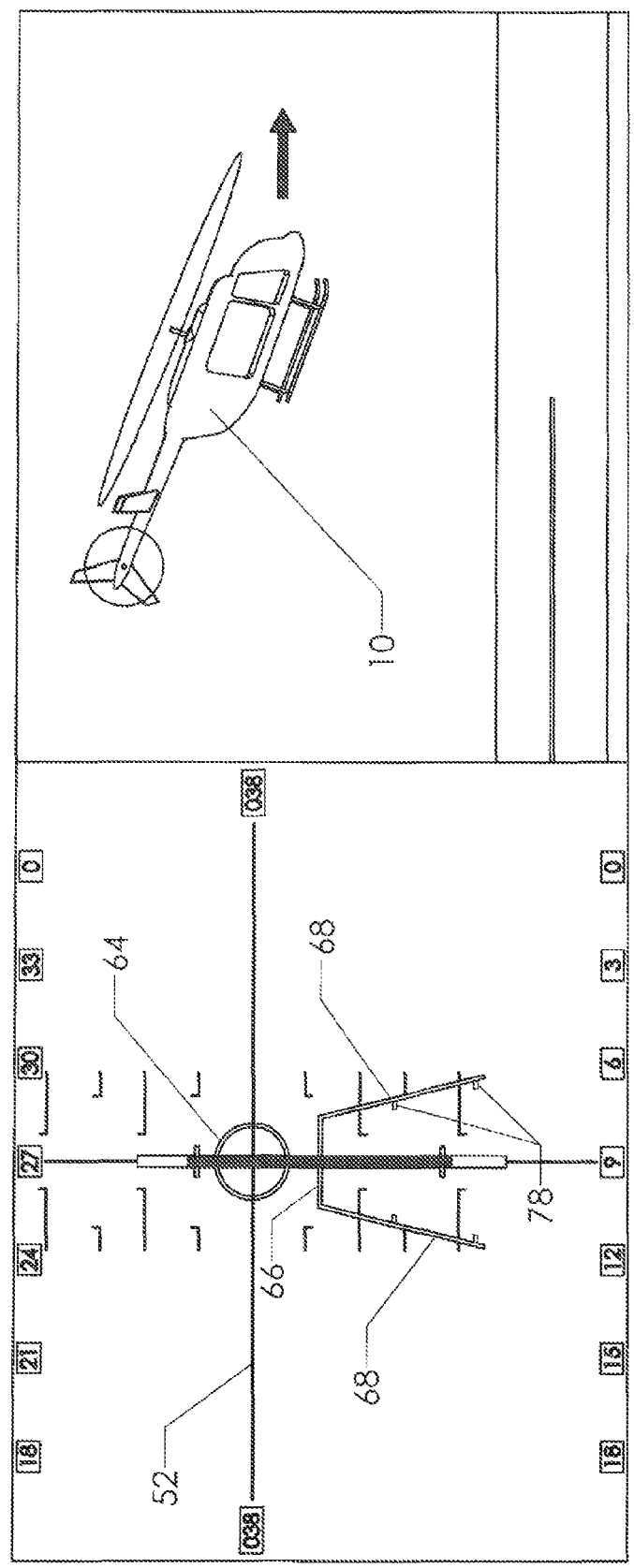
FIG. 14 is a combined graphical and perspective view, showing a helicopter accelerating in forward flight and the corresponding flight instrument display.

In FIG. 14, the pilot is accelerating forward. The collective pitch control has also been adjusted to stabilize the aircraft's attitude as it accelerates forward. Arms 68 have folded down to their maximum extent. The arms then grow in length to indicate further increasing forward speed. Hash marks 78 are provided along the growing length of each arm feather so that the pilot can quickly assess the helicopter's forward speed. The initial length of the arm at the point where they stop folding further downward and start to increase in length is indicated in FIG. 14 as first forward speed 86 length. The fully lengthened configuration is indicated as extended forward speed 88 length. The fully extended length is preferably configured to extend nearly as far as the edge of the display. This provides a visual cue that the pilot (if he continues to accelerate) will leave the hovering flight regime and enter the forward/cruise flight regime.

The hover display is intended primarily for use during slow-speed maneuvers. A different display can be used once the helicopter enters the aerodynamic flight regime. Thus, the forward speed shown in FIG. 14 is relatively low. The hover display can be set for a user's particular preferences, but the state shown in FIG. 14 would ideally represent a forward speed of between 25 and 30 knots. The pilot maintains 5-15 mph in order to traverse a distance, such as the distance to the far end of the runway. If the pilot then intends to enter into another stationary hover, he or she must stop the aircraft's forward momentum.

Figure 15:
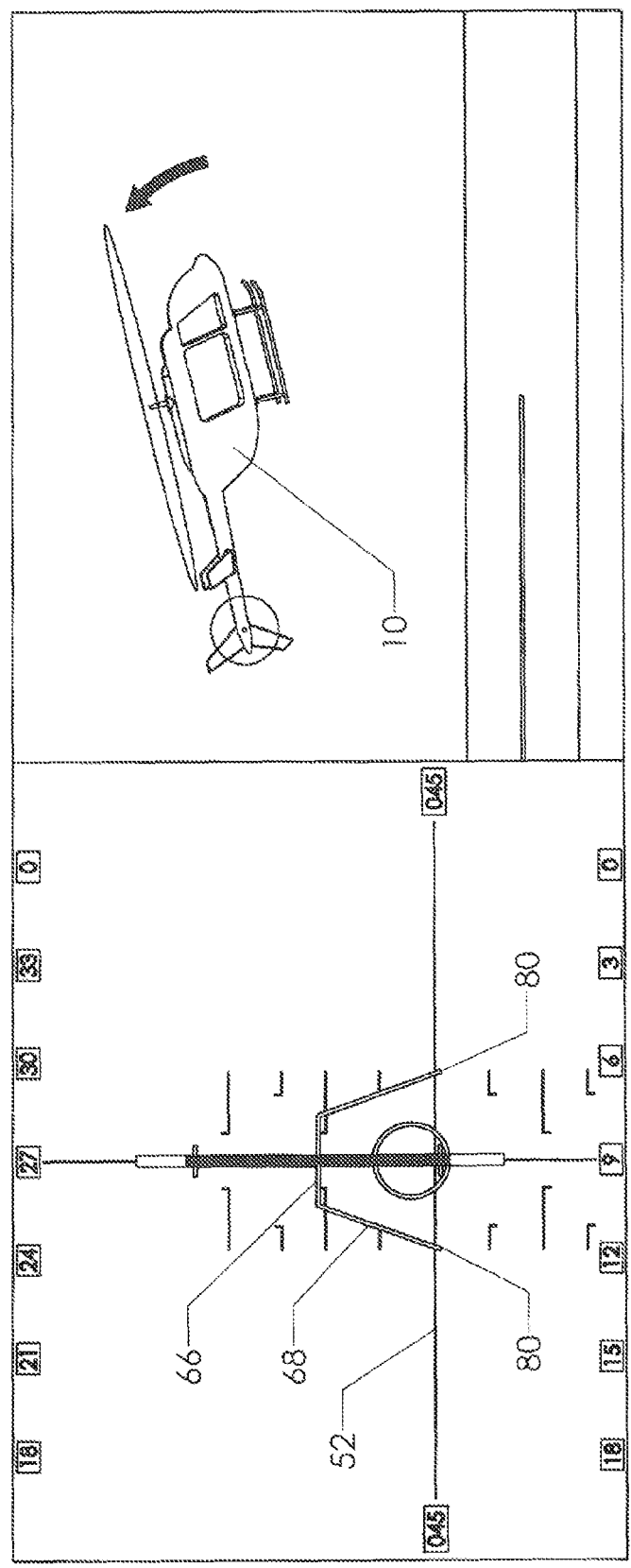
FIG. 15 is a combined graphical and perspective view, showing a helicopter pitching up to reduce forward momentum, along with the corresponding flight instrument display.

In FIG. 15, the pilot has pulled back on the cyclic pitch control in order to pitch the nose up. The hover display shows pitch line 66 well above horizon line 52. Pitching the helicopter's nose up causes the main rotor's thrust vector to decelerate the helicopter. Those skilled in the art will know that this represents a complex maneuver. The pilot must smoothly lower the nose as the aircraft's forward momentum falls away. If the maneuver is not performed smoothly, a pendulum effect can result.

The hover display includes visual cues designed to aid the pilot when transitioning from moving flight to a stationary hover. As the pilot pulls the nose up, the forward speed will decrease. The length of arms 68 will accordingly start to shorten from their extended forward speed 88 length to the first forward speed 86 length. The graphical elements in the hover display are scaled such that an appropriate amount of pitch is achieved if the pilot places the two hands 80 on horizon line 52 (The "hands" are the tips of the "arms"). Since the nose remains up, the main rotor will continue to decelerate the helicopter. Thus, the arms will pivot upward. In order to keep hands 80 on the horizon line, the pilot will have to bring the nose down (and pitch line 66 will move down).

Figure 16:
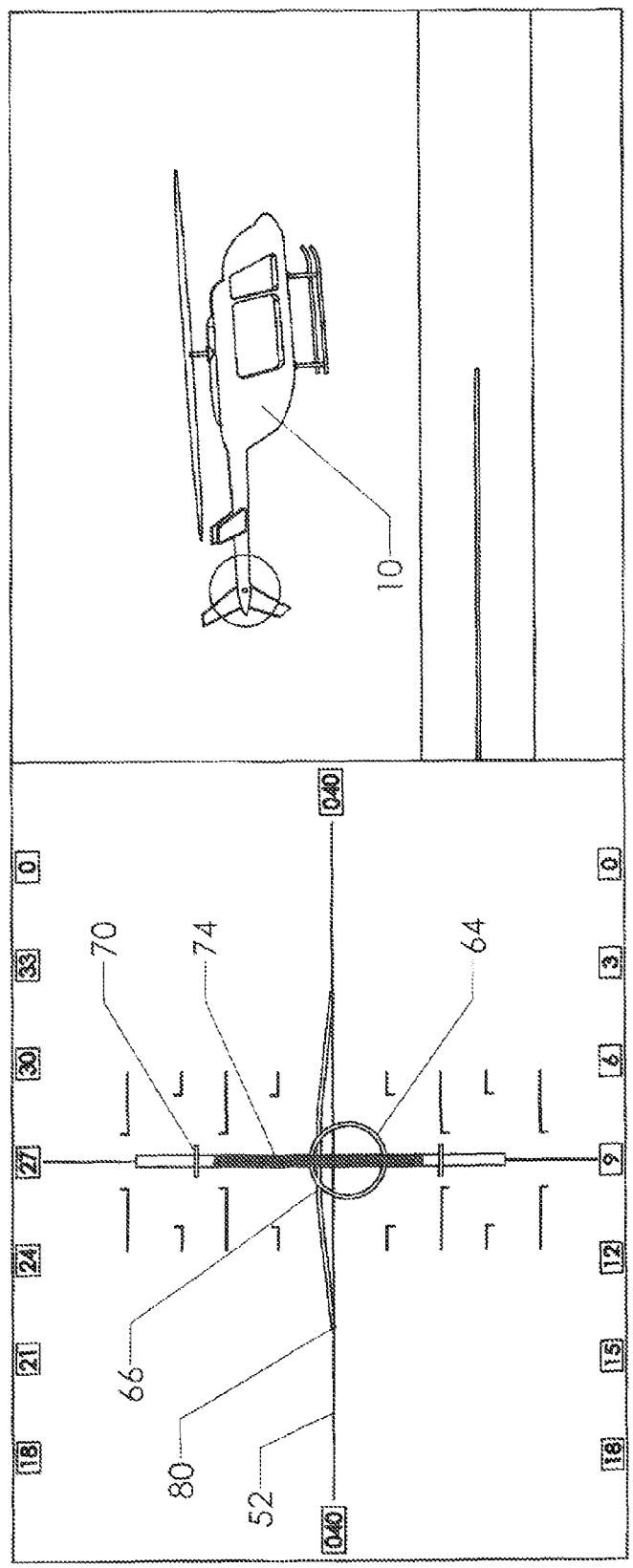
FIG. 16 is a combined graphical and perspective view, showing a helicopter reducing upwards pitch to enter a stable hover, along with the corresponding flight instrument display.

FIG. 16 shows this process 2 or 3 second later. Arms 68 have pivoted upward as the forward momentum has fallen away. The pilot has smoothly decreased the helicopter's pitch (shown by pitch line 66) so that hands 80 have remained on or near the horizon line. The result is that the nose is lowered in a smooth (non-oscillating) transition from forward flight to a stable hover.

Figure 17:
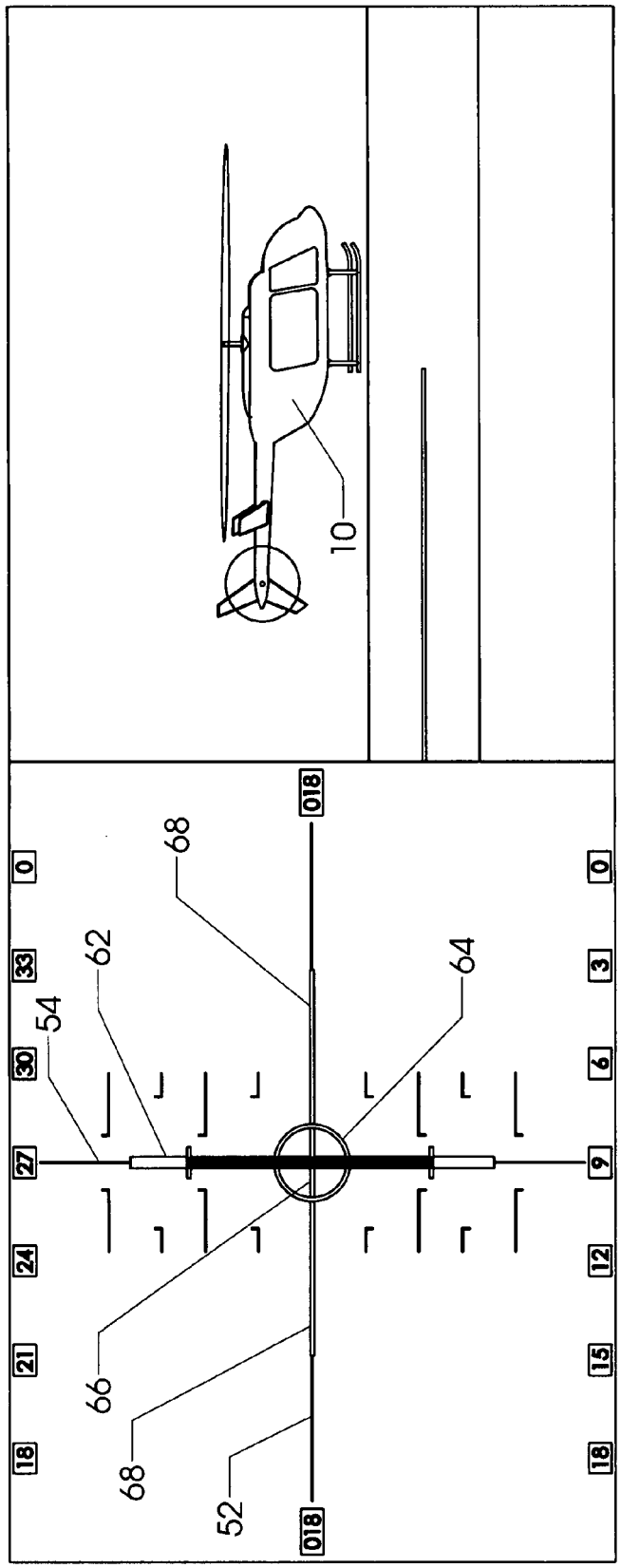
FIG. 17 is a combined graphical and perspective view, showing a helicopter in a stable hover and the corresponding flight instrument display.

The reader will also observe in FIG. 16 that the pilot has reduced the collective pitch (current torque 74 has shrunken inside the hover ticks) so that the helicopter starts to descend. In FIG. 16, the altitude displays show "040" (AGL). In FIG. 17 (a few seconds later), all forward velocity has stopped, and the helicopter has descended to "018" (AGL). The pilot has added additional torque to bring the currently applied collective torque even with the two hover ticks—resulting in a stable hover at an altitude of 18 feet. Thus, FIGS. 10-16 show how the hover display depicts events when a helicopter is lifted off, transitioned to forward flight, and transitioned back into a stable hover inside ground effect.

Figure 18:
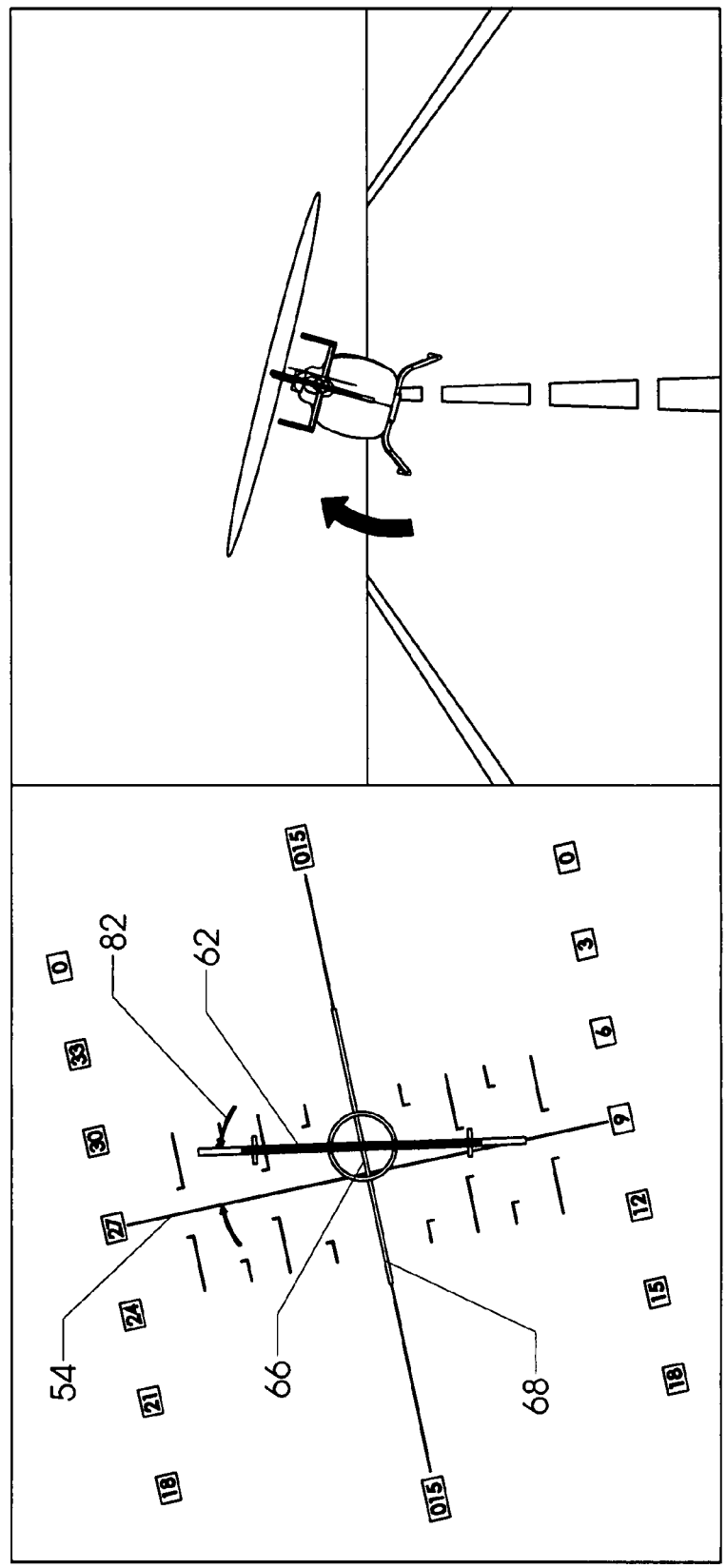
FIG. 18 is a combined graphical and perspective view, showing a helicopter rolling to the right in order to initiate lateral translation, along with the corresponding flight instrument display.

FIGS. 17 through 21 illustrate an analogous sequence for the case of lateral motion. As previously described, FIG. 17 shows helicopter 10 in a motionless hover at an altitude of 18 feet (AGL). In FIG. 18, the pilot has used the cyclic pitch control to roll the helicopter to the right. The horizon line and other elements within the hover display rotate counterclockwise with respect to the stationary power bar 62. The angular displacement between lubber line 54 and power bar 62 displays the helicopter's roll angle 82.

Figure 19:
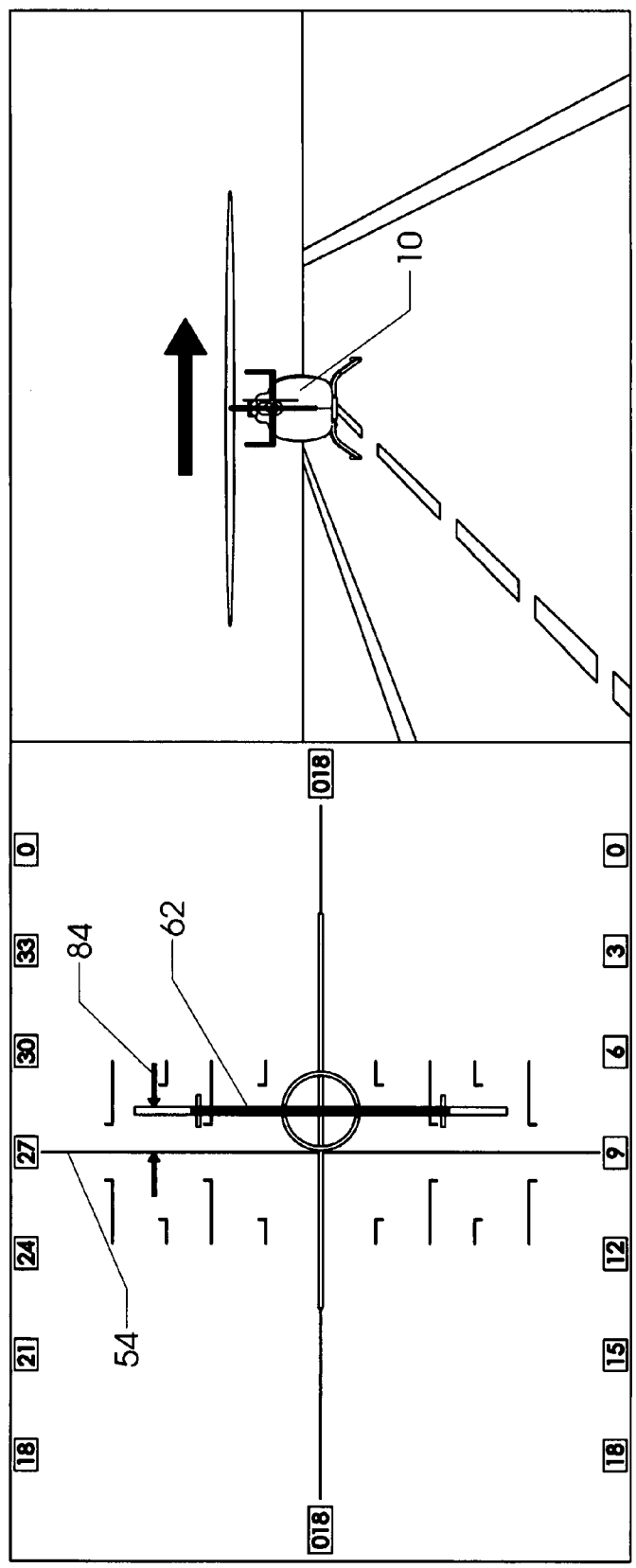
FIG. 19 is a combined graphical and perspective view, showing a helicopter undergoing lateral translation, along with the corresponding flight instrument display.

With the helicopter in the rolled state shown, a portion of the main rotor's lift vector accelerates the helicopter laterally to the right. Even if the pilot then moves the cyclic control to bring the helicopter back to the 0 degree roll position, the momentum imparted will cause the helicopter to continue moving right. FIG. 19 depicts this situation. The hover display shows the aircraft's lateral velocity as the separation distance between the power bar and the vertical lubber line 54 (denoted as lateral velocity 84). In the perspective view, the reader will note that the helicopter is translating laterally toward the right runway boundary.

Figure 20:
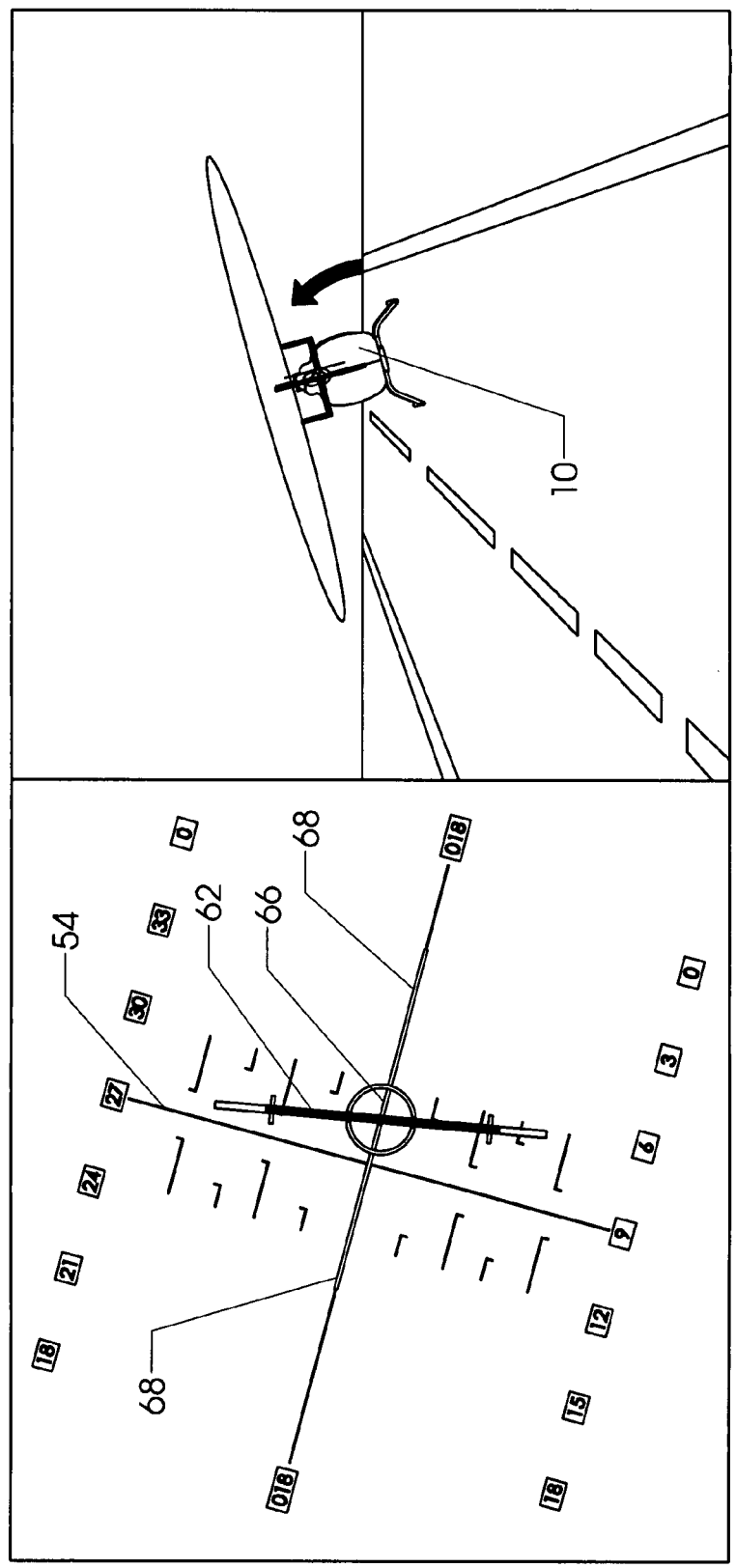
FIG. 20 is a combined graphical and perspective view, showing a helicopter rolling left in order to eliminate lateral translation to the right, along with the corresponding flight instrument display.
Figure 21:
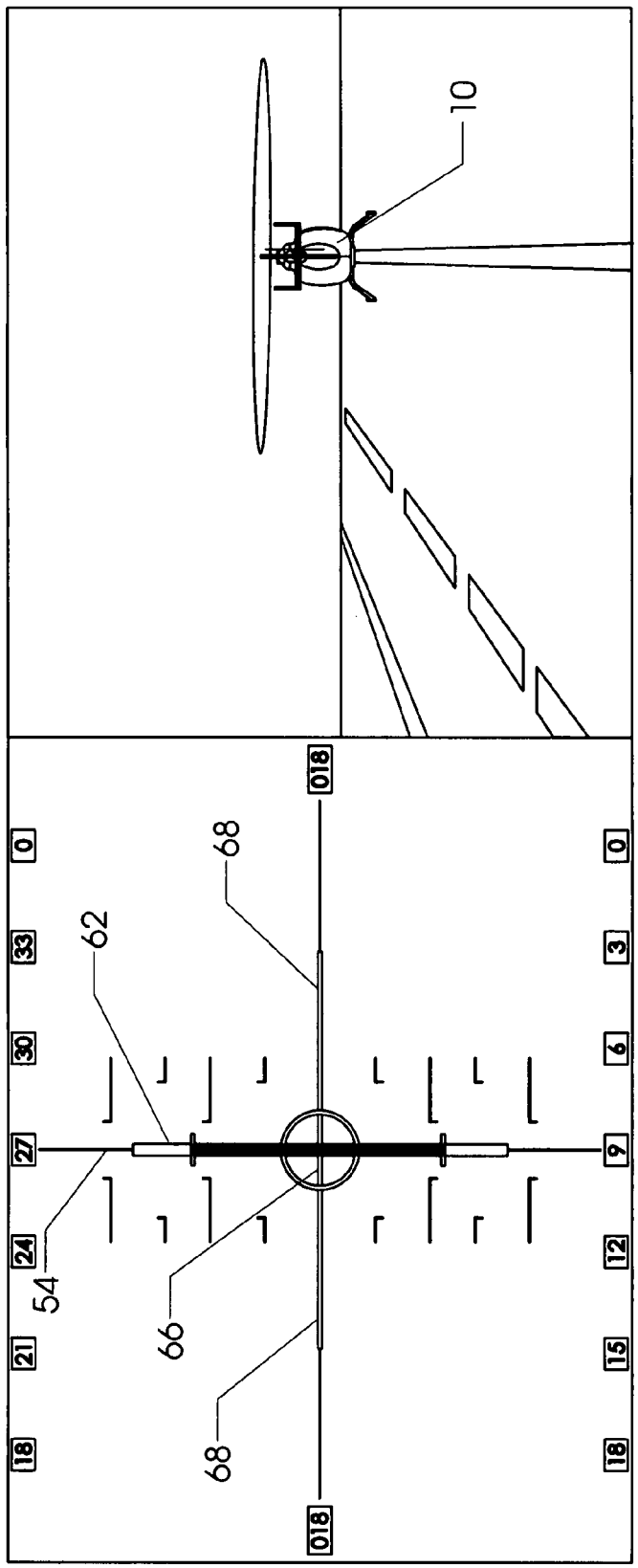
FIG. 21 is a combined graphical and perspective view, showing a helicopter in a stable hover and the corresponding flight instrument display.

In order to stop the lateral translation, the pilot must roll the helicopter to the left. This will direct a portion of the main rotor's lift vector away from the direction of travel. FIG. 20 shows this left roll maneuver. The hover display again shows the helicopter's roll angle. The lateral displacement of the power bar from the lubber lines shows the helicopter's lateral velocity. Thus, the pilot can decrease the roll angle as the power bar slides over toward the lubber lines, ultimately decreasing the roll angle to zero and laying the power bar on top of the lubber lines. At this point, the helicopter will again have obtained a motionless hover. FIG. 21 shows this state, with the hover display showing no motion.

Figure 22:
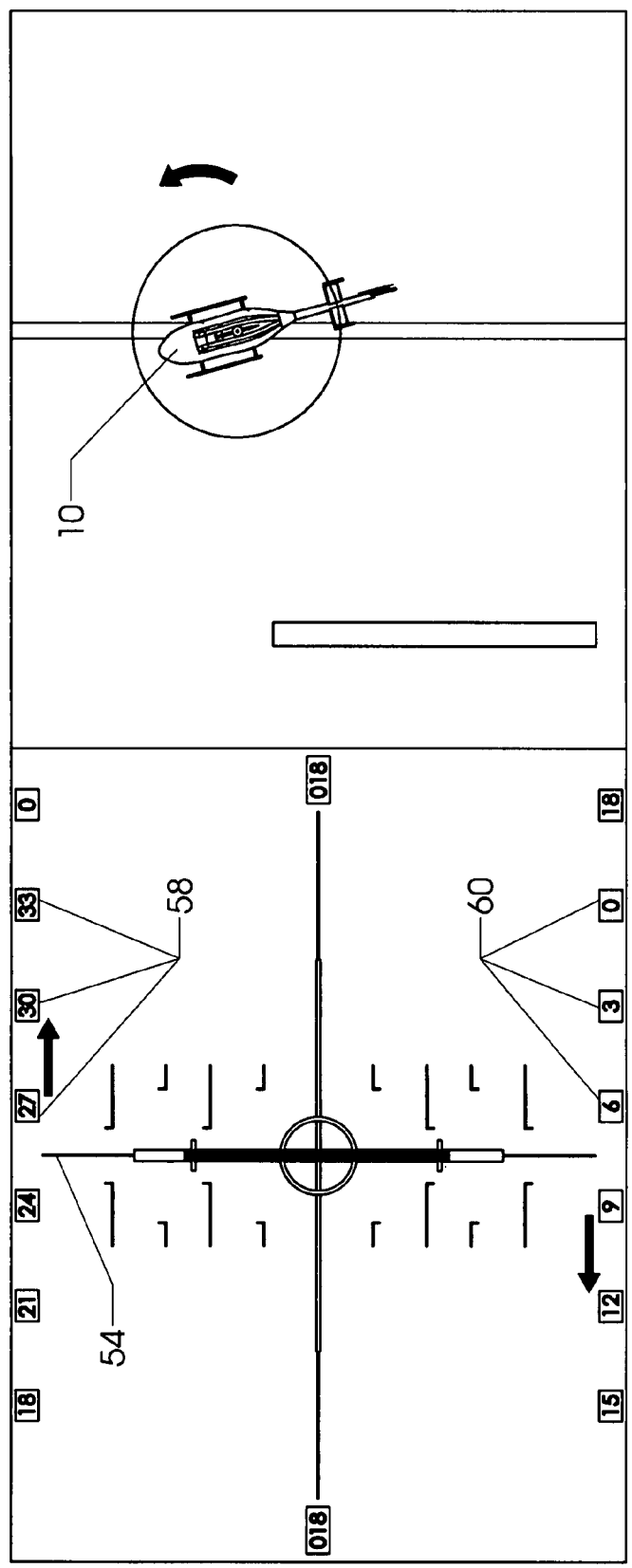
FIG. 22 is a combined graphical and plan view, showing a helicopter yawing in a counterclockwise direction, along with the corresponding flight instrument display.
Figure 23:
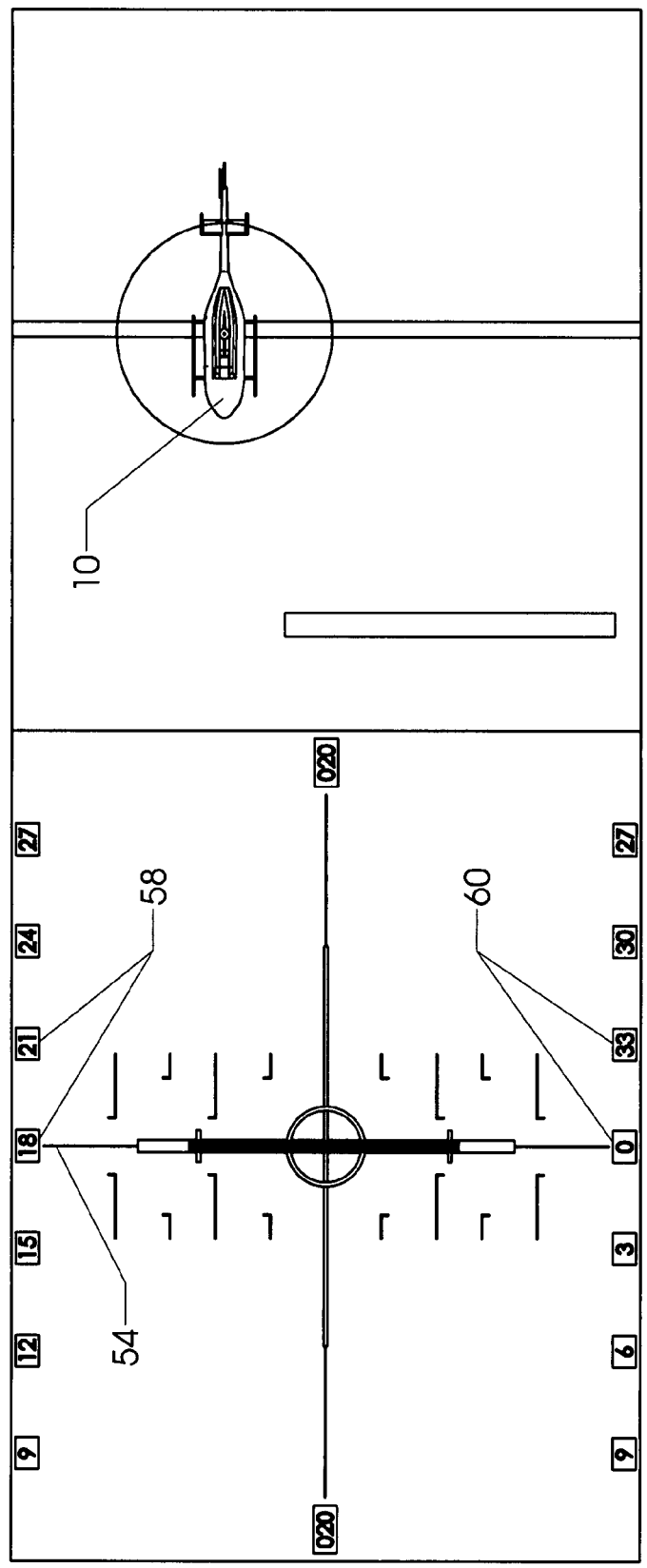
FIG. 23 is a combined graphical and plan view, showing a helicopter stopping a counterclockwise yaw, along with the corresponding flight instrument display.

While in a motionless hover, the pilot can use the rudder pedals (which control the pitch of the tail rotor) to yaw the aircraft. In FIG. 22, the pilot has pressed the left rudder pedal forward to yaw the helicopter to the left. The yaw is shown in the hover display by the fact that forward headings 58 are translating to the right, while rearward headings 60 are translating to the left. The plan view shows the yawing of the helicopter, as it hovers over the right runway boundary. In FIG. 23, the yaw maneuver has been concluded by stabilizing the helicopter on a heading of 180 degrees ("18").

Figure 24:
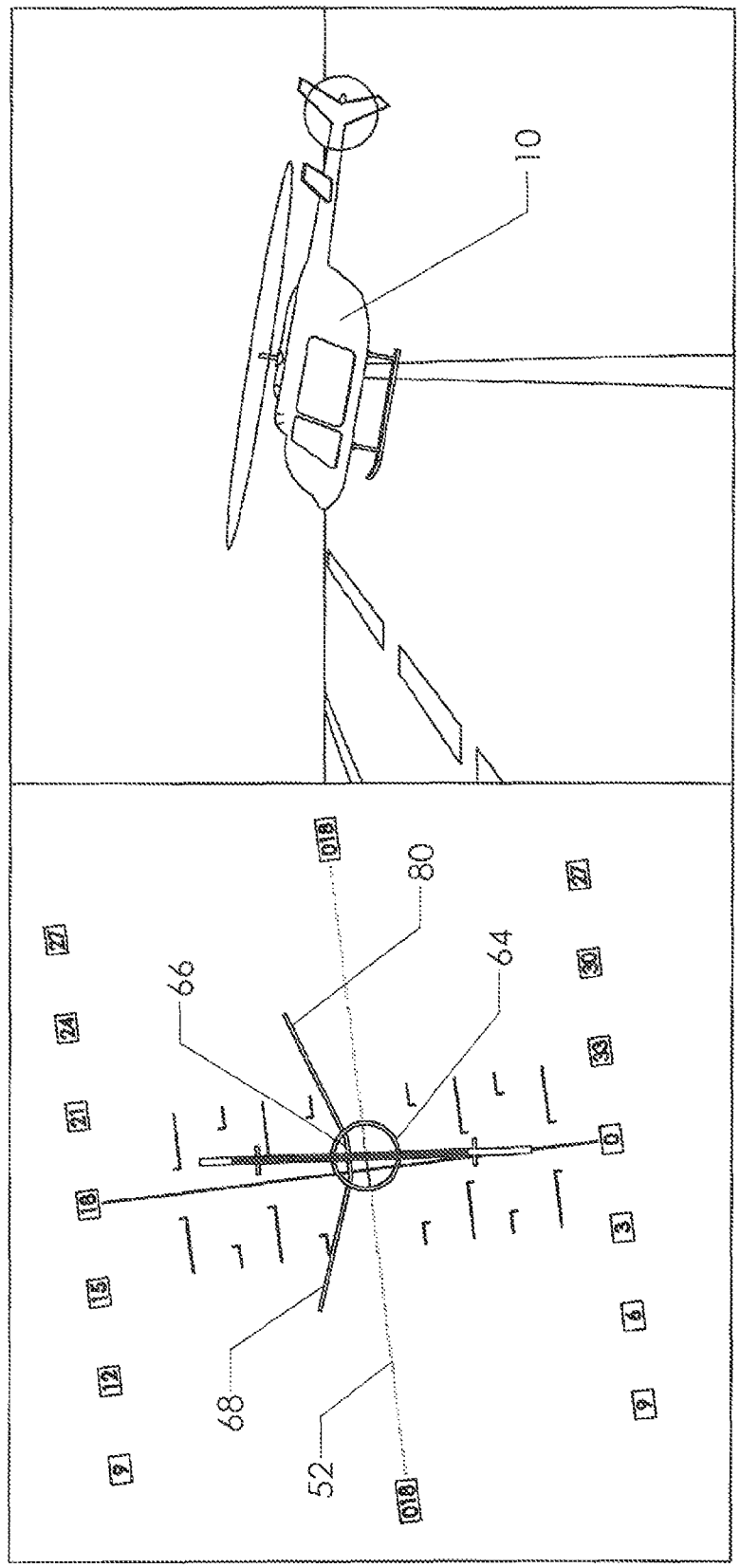
FIG. 24 is a combined graphical and perspective view, showing a helicopter pitching up to initiate rearward translation, along with the corresponding flight instrument display.

At this point, the pilot puts the helicopter into a slow rearward translation by pulling back on the cyclic pitch control. FIG. 24 shows this maneuver. Pitch line 66 has been raised above the horizon line. The two arms 68 have started bending upward, indicating rearward velocity. The helicopter has also rolled slightly to the right. Unlike the prior examples where the motion illustrated was often limited to one axis, FIG. 24 represents a more realistic scenario. The pilot must monitor all the degrees of freedom. The hover display has shown an unintentional roll, which the pilot quickly understands can be nulled by rolling slightly left.

If the pilot continues to accelerate rearward, arms 68 will bend further upward. The display is an exact mirror of what occurs during forward translation. As rearward speed increases, the arms will continue to bend upward until they lock into a fixed angle at a first rearward speed. As rearward speed increases further, the feathers remain at the same angle and begin to grow in length (a mirror of the configuration shown in FIG. 14). They eventually grow to an extended rearward speed length, which preferably corresponds to the limit of the hovering flight regime.

Figure 25:
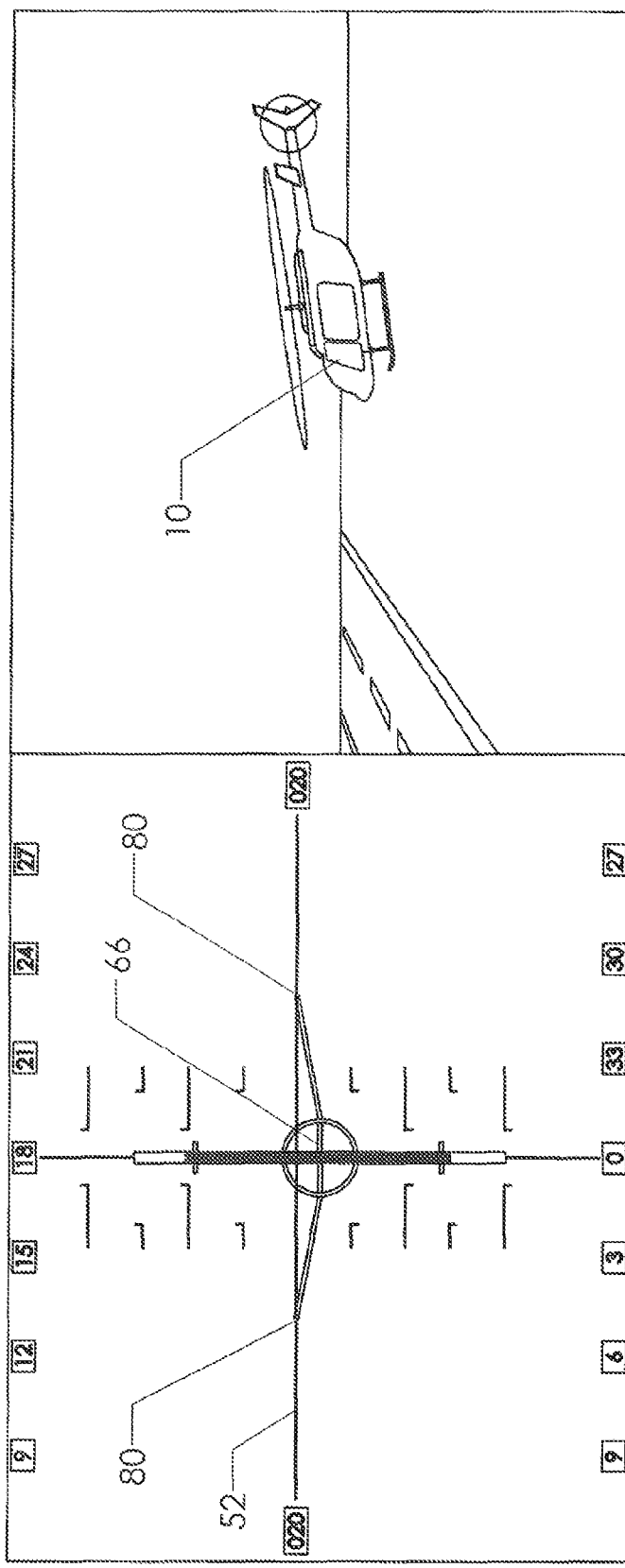
FIG. 25 is a combined graphical and perspective view, showing a helicopter pitching down to stop rearward translation, along with the corresponding flight instrument display.

When the pilot desires to eliminate the rearward motion, he or she will drop the helicopter's nose. This step is shown in FIG. 25, where pitch line 66 appears below the horizon line. The pilot places hands 80 on the horizon line and holds them there by bringing the nose back up as the rearward velocity falls away. The pilot thereby reenters the motionless hover state.

Figure 26:
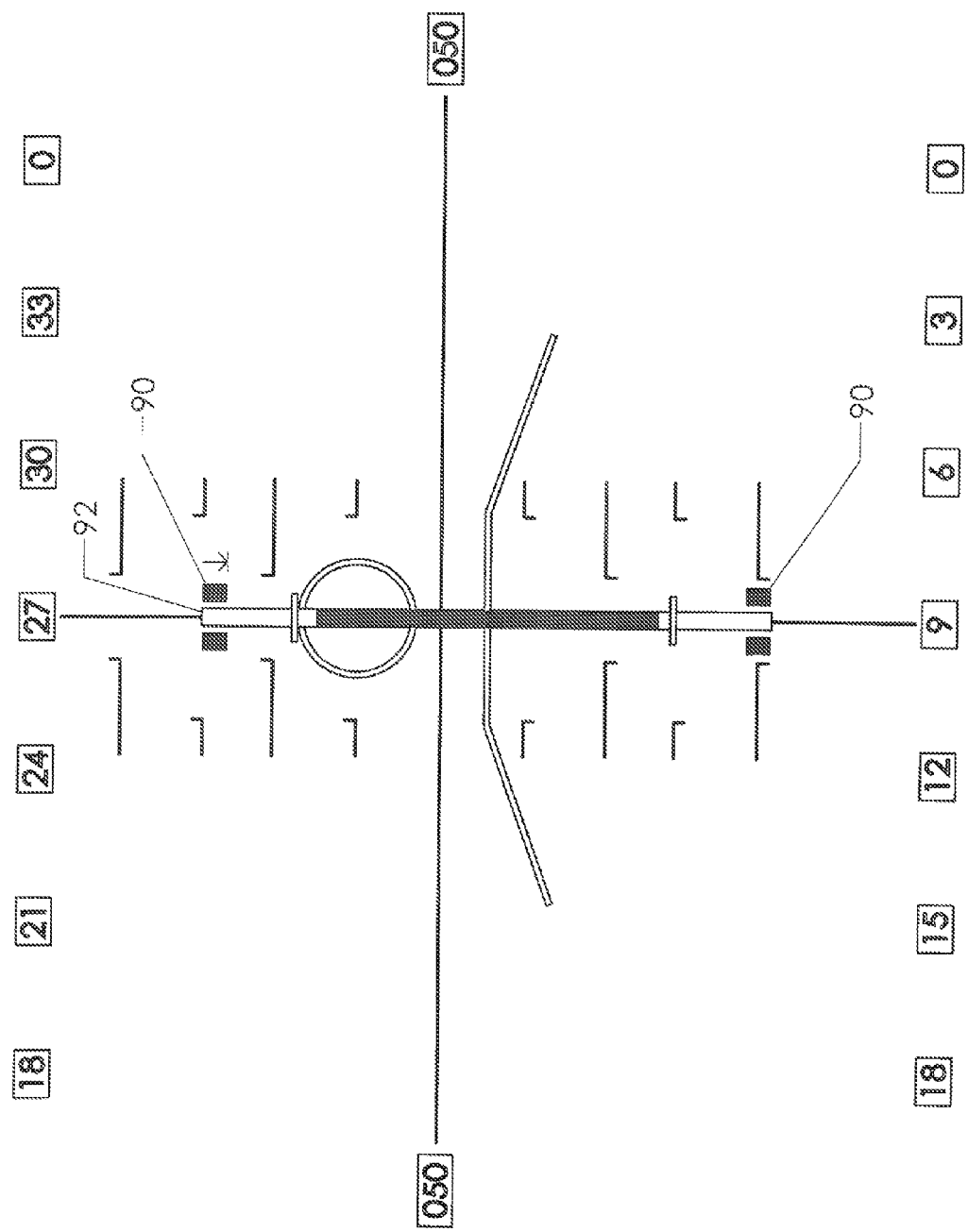
FIG. 26 is a graphical view, showing an additional display element for main rotor RPM.
Figure 27:
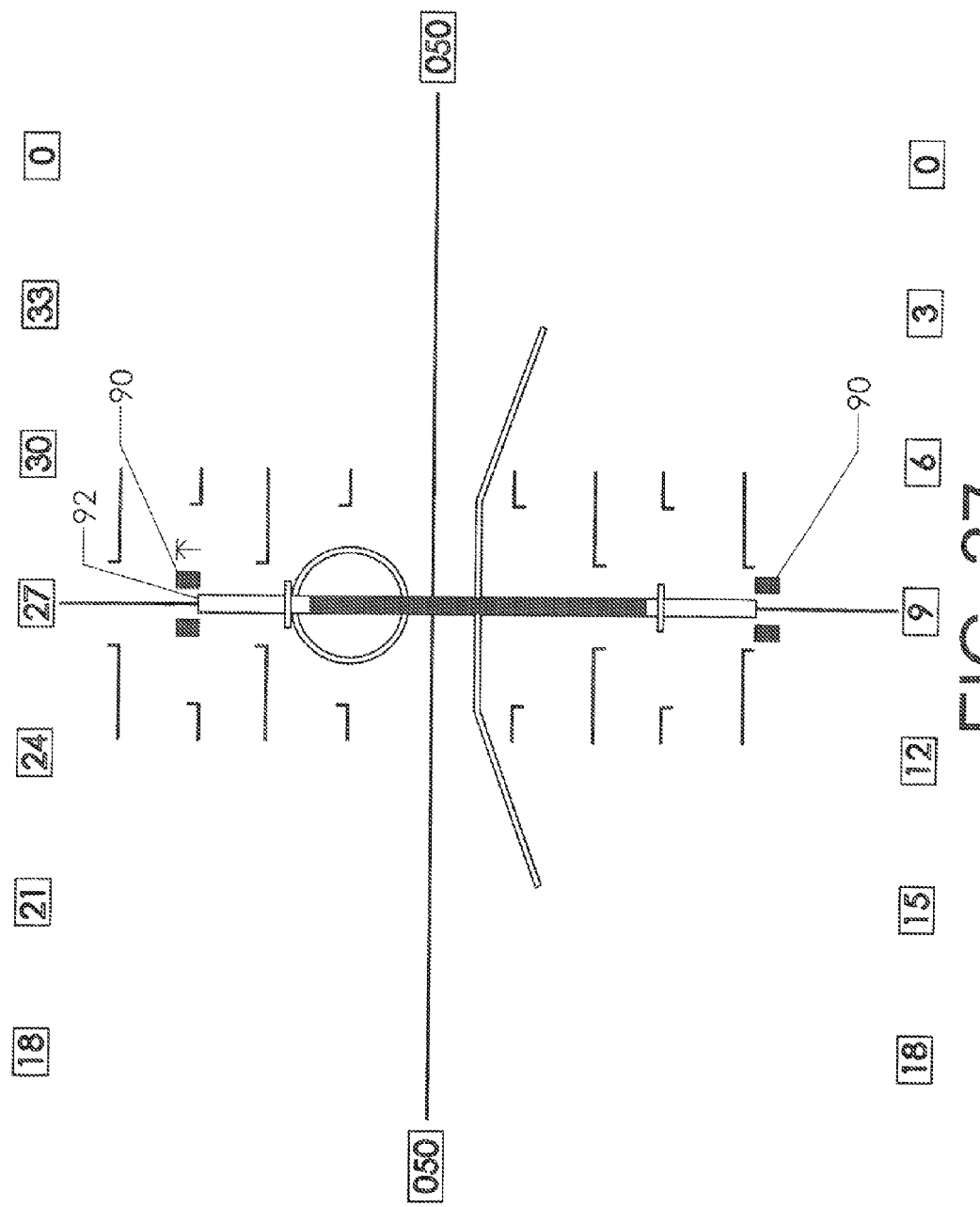
FIG. 27 is a graphical view, showing an additional display element for main rotor RPM.

Additional features indicating aircraft setting can be added to the display. FIGS. 26 and 27 depict one such feature. Those skilled in the art will know that a rotor-wing aircraft must maintain its main rotor RPM within a fairly narrow band. FIG. 26 depicts an indicator showing the current state of the main rotor RPM. Main rotor RPM bar 90 extends on either side of the power bar (A display is provided at the top and the bottom of the power bar). If the main rotor RPM is decreasing below its optimum state, main rotor RPM bar 90 will descend inward from the two power bar tips 92. The RPM display is preferably presented in a conspicuous color, such as red. The state shown in FIG. 27 alerts the pilot that the main rotor RPM is slower than it should be.

Of course, aircraft settings may also cause the main rotor RPM to go too high. FIG. 26 depicts this scenario. The reader will observe how main rotor RPM bar 90 extends outward from power bar tip 92. This display informs the pilot that the main rotor RPM is now too high. The simple display allows the pilot to quickly take corrective action.

The reader will thereby appreciate how the proposed hover display provides a pilot with clear information regarding an aircraft's roll, pitch, yaw, forward/rearward translation, lateral translation, vertical translation, and power/collective settings. All this information is provided in a single, integrated display.

Although the preceding description contains significant detail, it should not be construed as limiting the scope of the invention but rather as providing illustrations of the preferred embodiments of the invention. Thus, the scope of the invention should be fixed by the following claims, rather than by the examples given.

The invention claimed is:

1. A hover display for displaying an attitude and motion of an aircraft, comprising:
   a. an external reference display including a horizon line and a lubber line that is perpendicular to said horizon line;
   b. an aircraft metaphor including a pitch line and a power bar;
   c. wherein said power bar remains vertical and said external reference display rotates with respect to said power bar in order to indicate a roll of said aircraft;
   d. wherein said external reference display translates vertically with respect to said pitch line in order to indicate a pitch of said aircraft; and
   e. at least a portion of said aircraft metaphor moves laterally with respect to said lubber line in order to indicate a speed of said aircraft in a lateral direction.

2. A hover display as recited in claim 1, wherein:
   a. said aircraft metaphor includes a pivoting arm extending from said pitch line; and
   b. said arm pivots downward with respect to said pitch line to indicate a forward speed of said aircraft and pivots upward with respect to said pitch line to indicate a rearward speed of said aircraft.

3. A hover display as recited in claim 2, wherein:
   a. said aircraft metaphor includes a vertical speed ball; and
   b. a vertical displacement of said speed ball from said horizon line indicates a vertical speed of said aircraft.

4. A hover display as recited in claim 3, wherein:
   a. said arm pivots downward to a maximum extent, thereby indicating a first forward speed; and
   b. after said arm pivots downward to said maximum extent, said arm extends in length to indicate additional forward speed beyond said first forward speed.

5. A hover display as recited in claim 4, further comprising hash marks added to said arm to denote an amount of extension in said arm's length, thereby indicating an amount of forward speed beyond said first forward speed.

6. A hover display as recited in claim 3, wherein said external reference display further comprises:
   a. a plurality of forward headings displayed proximate a top of said hover display; and
   b. a plurality of rearward headings displayed proximate a bottom of said hover display.

7. A hover display as recited in claim 3, wherein:
   a. said arm pivots upward to a maximum extent, thereby indicating a first rearward speed; and
   b. after said arm pivots upward to said maximum extent, said arm extends in length to indicate additional rearward speed beyond said first rearward speed.

8. A hover display as recited in claim 7, further comprising hash marks added to said arm to denote an amount of extension in said arm's length, thereby indicating an amount of rearward speed beyond said first rearward speed.

9. A hover display as recited in claim 2, wherein:
   a. said power bar has a first portion having a first overall height and a second portion having a second overall height;
   b. said first overall height of said first portion indicates a maximum available main rotor torque in a rotor wing aircraft; and
   c. said second overall height of said second portion indicates a currently applied main rotor torque in the rotor wing aircraft.

10. A hover display as recited in claim 9, wherein said power bar includes a first hover tick indicating an amount of main rotor torque required to maintain a hover inside of ground effect, with said amount of required main rotor torque being a function of a current state of said rotor wing aircraft and a current state of a surrounding atmosphere.

11. A hover display as recited in claim 10, wherein said power bar includes a second hover tick indicating an amount of main rotor torque required to hover in a state defined by a pilot of said rotor wing aircraft.

12. A hover display as recited in claim 2, wherein:
   a. said arm pivots downward to a maximum extent, thereby indicating a first forward speed; and
   b. after said arm pivots downward to said maximum extent, said arm extends in length to indicate additional forward speed beyond said first forward speed.

13. A hover display as recited in claim 12, further comprising hash marks added to said arm to denote an amount of extension in said arm's length, thereby indicating an amount of forward speed beyond said first forward speed.

14. A hover display as recited in claim 2, wherein said external reference display further comprises:
   a. a plurality of forward headings displayed proximate a top of said hover display; and
   b. a plurality of rearward headings displayed proximate a bottom of said hover display.

15. A hover display as recited in claim 2, wherein:
   a. said arm pivots upward to a maximum extent, thereby indicating a first rearward speed; and
   b. after said arm pivots upward to said maximum extent, said arm extends in length to indicate additional rearward speed beyond said first rearward speed.

16. A hover display as recited in claim 15, further comprising hash marks added to said arm to denote an amount of extension in said arm's length, thereby indicating an amount of rearward speed beyond said first rearward speed.

17. A hover display as recited in claim 1, wherein:
   a. said aircraft metaphor includes a vertical speed ball; and
   b. a vertical displacement of said speed ball from said horizon line indicates a vertical speed of said aircraft.

18. A hover display as recited in claim 17, wherein:
   a. said power bar has a first portion having a first overall height and a second portion having a second overall height;
   b. said first overall height of said first portion indicates a maximum available main rotor torque in a rotor wing aircraft; and
   c. said second overall height of said second portion indicates a currently applied main rotor torque in the rotor wing aircraft.

19. A hover display as recited in claim 17, wherein said external reference display further comprises:
   a. a plurality of forward headings displayed proximate a top of said hover display; and
   b. a plurality of rearward headings displayed proximate a bottom of said hover display.

20. A hover display as recited in claim 1, wherein:
   a. said power bar has a first portion having a first overall height and a second portion having a second overall height;
   b. said first overall height of said first portion indicates a maximum available main rotor torque in a rotor wing aircraft; and
   C. said second overall height of said second portion indicates a currently applied main rotor torque in the rotor wing aircraft.

21. A hover display as recited in claim 20, wherein said power bar includes a first hover tick indicating an amount of main rotor torque required to maintain a hover inside of ground effect, with said amount of required main rotor torque being a function of a current state of said rotor wing aircraft and a current state of a surrounding atmosphere.

22. A hover display as recited in claim 21, wherein said power bar includes a second hover tick indicating an amount of main rotor torque required to hover in a state defined by a pilot of said rotor wing aircraft.

23. A hover display as recited in claim 20, further comprising:
   a. wherein said portion of said power bar has an upper power bar tip; and
   b. a main rotor RPM bar extending downward from said upper power bar tip to indicate a main rotor RPM which is lower than a defined value and extending upward from said upper power bar tip to indicate a main rotor RPM which is higher than said defined value.

24. A hover display as recited in claim 23, further comprising:
   a. wherein said first portion of said power bar has a lower power bar tip; and
   b. a main rotor RPM bar extending upward from said lower power bar tip to indicate a main rotor RPM which is lower than a defined value and extending downward from said lower power bar tip to indicate a main rotor RPM which is higher than said defined value.

25. A hover display as recited in claim 1, wherein said external reference display further comprises:
   a. a plurality of forward headings displayed proximate a top of said hover display; and
   b. a plurality of rearward headings displayed proximate a bottom of said hover display.

26. A hover display for displaying an attitude and motion of an aircraft, and particularly for assisting a pilot of said aircraft in transitioning from forward/rearward flight to a stable hover, comprising:
   a. an external reference display, including a horizon line;
   b. an aircraft metaphor, including
      i. a pitch line,
      ii. a pivoting arm extending from said pitch line, wherein said arm includes a hand distal from said pitch line;
   c. wherein said external reference display moves up and down with respect to said pitch line in order to indicate a pitch of said aircraft;
   d. wherein said arm pivots downward with respect to said pitch line to indicate a forward speed of said aircraft and pivots upward with respect to said pitch line to indicate a rearward speed of said aircraft; and
   e. wherein said motion of said external reference display with respect to said aircraft metaphor is scaled, and said arm is scaled, such that by placing said hand proximate said horizon line, said pilot places said aircraft in the correct pitch to enter said stable hover.

27. A hover display as recited in claim 26, wherein:
   a. said aircraft metaphor includes a vertical speed ball; and
   b. a vertical displacement of said speed ball from said horizon line indicates a vertical speed of said aircraft.

* * * * *